US010764922B2

(12) United States Patent
Kato et al.

(10) Patent No.: US 10,764,922 B2
(45) Date of Patent: Sep. 1, 2020

(54) TERMINAL DEVICE, BASE STATION DEVICE, RADIO COMMUNICATION METHOD, AND INTEGRATED CIRCUIT

(71) Applicant: Sharp Kabushiki Kaisha, Sakai, Osaka (JP)

(72) Inventors: Yasuyuki Kato, Sakai (JP); Katsunari Uemura, Sakai (JP); Shohei Yamada, Sakai (JP); Hidekazu Tsuboi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/541,597

(22) PCT Filed: Dec. 28, 2015

(86) PCT No.: PCT/JP2015/086471
§ 371 (c)(1),
(2) Date: Jul. 5, 2017

(87) PCT Pub. No.: WO2016/111222
PCT Pub. Date: Jul. 14, 2016

(65) Prior Publication Data
US 2017/0359836 A1 Dec. 14, 2017

(30) Foreign Application Priority Data
Jan. 8, 2015 (JP) .................................. 2015-001942

(51) Int. Cl.
*H04W 74/08* (2009.01)
*H04W 92/10* (2009.01)
(Continued)

(52) U.S. Cl.
CPC .......... *H04W 74/08* (2013.01); *H04B 17/318* (2015.01); *H04W 4/70* (2018.02); *H04W 92/10* (2013.01); *H04L 5/0053* (2013.01)

(58) Field of Classification Search
None
See application file for complete search history.

(56) References Cited

U.S. PATENT DOCUMENTS

2009/0186624 A1* 7/2009 Cave ...................... H04L 1/1887
455/450
2009/0316638 A1* 12/2009 Yi ........................... H04W 24/08
370/329

(Continued)

FOREIGN PATENT DOCUMENTS

JP       2014-220662 A       11/2014

OTHER PUBLICATIONS

Source: Sony Title: Enhanced Coverage Issues. 3GPP TSG-RAN WG2 Meeting #85 R2-140825 Prague, Czech Republic, Feb. 10-14, 2014 Agenda item: 7.9.2.

(Continued)

*Primary Examiner* — Andrew C Oh
(74) *Attorney, Agent, or Firm* — ScienBiziP, P.C.

(57) ABSTRACT

A terminal device configured to communicate with a base station device receives random access common information including information on a random access response reception and information on a contention resolution message reception for each repetition level from the base station device, selects a random access preamble corresponding to a repetition level using the random access common information, and selects a contention resolution timer value corresponding to the repetition level selected from the random access common information.

8 Claims, 8 Drawing Sheets

(51) Int. Cl.
*H04B 17/318* (2015.01)
*H04W 4/70* (2018.01)
*H04L 5/00* (2006.01)

(56) References Cited

U.S. PATENT DOCUMENTS

| | | | | |
|---|---|---|---|---|
| 2010/0041428 A1* | 2/2010 | Chen | H04W 52/16 | 455/522 |
| 2010/0074204 A1 | 3/2010 | Meylan | | |
| 2010/0142470 A1* | 6/2010 | Park | H04L 1/1854 | 370/329 |
| 2010/0232382 A1* | 9/2010 | Gauvreau | H04W 72/0413 | 370/329 |
| 2011/0002262 A1* | 1/2011 | Wang | H04L 1/1812 | 370/328 |
| 2011/0085509 A1* | 4/2011 | Park | H04W 74/08 | 370/329 |
| 2011/0116364 A1* | 5/2011 | Zhang | H04W 74/08 | 370/216 |
| 2011/0261763 A1* | 10/2011 | Chun | H04W 74/008 | 370/329 |
| 2012/0003977 A1* | 1/2012 | Iwamura | H04W 36/0033 | 455/436 |
| 2012/0113938 A1* | 5/2012 | Larsson | H04W 74/008 | 370/329 |
| 2012/0307767 A1* | 12/2012 | Yamada | H04W 74/02 | 370/329 |
| 2013/0107778 A1* | 5/2013 | Ryu | H04W 76/28 | 370/311 |
| 2013/0121225 A1* | 5/2013 | Ryu | H04W 52/0229 | 370/311 |
| 2013/0128733 A1* | 5/2013 | Lee | H04W 74/04 | 370/230 |
| 2013/0182668 A1* | 7/2013 | Xu | H04W 74/0833 | 370/329 |
| 2013/0301421 A1* | 11/2013 | Yi | H04W 52/0216 | 370/241 |
| 2013/0301611 A1* | 11/2013 | Baghel | H04L 67/18 | 370/331 |
| 2014/0023051 A1* | 1/2014 | Chen | H04L 5/0062 | 370/336 |
| 2014/0086173 A1* | 3/2014 | Sadeghi | H04L 5/003 | 370/329 |
| 2014/0185467 A1* | 7/2014 | Heo | H04L 1/1812 | 370/252 |
| 2014/0247742 A1* | 9/2014 | Lee | H04W 24/10 | 370/252 |
| 2015/0117233 A1* | 4/2015 | Wong | H04L 1/188 | 370/252 |
| 2015/0173120 A1* | 6/2015 | Yamada | H04W 76/11 | 370/331 |
| 2015/0304891 A1* | 10/2015 | Dinan | H04L 69/28 | 370/331 |
| 2015/0312798 A1* | 10/2015 | Rune | H04L 1/0072 | 370/236 |
| 2015/0319744 A1* | 11/2015 | Jung | H04W 72/0406 | 370/328 |
| 2016/0007406 A1* | 1/2016 | Yi | H04W 76/28 | 370/252 |
| 2016/0066255 A1* | 3/2016 | Marinier | H04W 48/16 | 370/350 |
| 2016/0100431 A1 | 4/2016 | Kishiyama et al. | | |
| 2016/0150507 A1* | 5/2016 | Kim | H04W 4/70 | 455/450 |
| 2016/0227580 A1* | 8/2016 | Xiong | H04B 17/318 | |
| 2016/0227585 A1* | 8/2016 | Yi | H04W 72/1273 | |
| 2016/0242212 A1* | 8/2016 | Wong | H04W 4/70 | |
| 2016/0255616 A1* | 9/2016 | Martin | H04W 72/048 | 370/330 |
| 2016/0278124 A1* | 9/2016 | Zhao | H04W 56/004 | |
| 2016/0302080 A1* | 10/2016 | Hwang | H04B 7/0413 | |
| 2016/0330766 A1* | 11/2016 | Liu | H04W 72/0446 | |
| 2017/0295511 A1* | 10/2017 | Sebire | H04W 74/0833 | |

OTHER PUBLICATIONS

Source: Ericsson Title: Impact of coverage enhancements on RAN. 3GPP TSG-RAN WG2 #85 Tdoc R2-140675 Prague, Czech Republic, Feb. 10-14, 2014 Agenda Item: 7.9.2.
Source: Ericsson; Title: Rel-12 agreements for MTC; "Rel-12 agreements for MTC", R1-143784, 3GPP TSG-RAN WG1 Meeting #78bis Ljubljana, Slovenia, Oct. 6-10, 2014; Agenda Item: 7.3.1.
3GPP TR(Technical Report)36.888, V12.0.0(Jun. 2013), 3rd Generation Partnership Project; Technical Specification Group Radio Access Network; Study on provision of low-cost Machine-Type Communications (MTC) User Equipments (UEs) based on LTE (release 12).
3GPP TS(Technical Specification)36.300, V11.5.0(Mar. 2013), 3rd Generation Partnership Project; Technical Specification Group Radio Access Network; Evolved Universal Terrestrial Radio Access(E-UTRA) and Evolved Universal Terrestrial Radio Access Network(E-UTRAN), Overall description Stage2.
CATT, PRACH coverage enhancement, R1-144623, 3GPP TSG RAN WG1 Meeting #79, San Francisco, USA, Nov. 17-21, 2014.
Mediatek Inc., Impact of Enhanced coverage on other physical Channels, R2-1405263GPP TSG-RAN2 #85 Meeting, Prague, Czech Republic, Feb. 10-14, 2014.
Samsung, "RACH Parameters Optimisation", R3-091417, 3GPP TSG-RAN WG3 Meeting #64 San Francisco, US, May 4-8, 2009.

\* cited by examiner

TERMINAL DEVICE, BASE STATION DEVICE, RADIO COMMUNICATION METHOD, AND INTEGRATED CIRCUIT

TECHNICAL FIELD

The present invention relates to a radio communication system, a terminal device, and a base station device, and more specifically, relates to a radio communication system, a base station device, a terminal device, a radio communication method, and an integrated circuit related to machine-type communication or machine-to-machine communication.

This application claims priority based on Japanese Patent Application No. 2015-001942 filed on Jan. 8, 2015, the contents of which are incorporated herein.

BACKGROUND ART

In the 3rd Generation Partnership Project (3GPP), a W-CDMA scheme is standardized as a third generation cellular mobile communication scheme, and service is provided. Furthermore, HSDPA which has a faster communication speed is also standardized, and service is provided.

At the same time, in the 3GPP, third generation radio access evolution, that is, Long Term Evolution (LTE) or Evolved Universal Terrestrial Radio Access (EUTRA) is standardized, and an LTE service has been started. An orthogonal frequency division multiplexing (OFDM) scheme which can withstand multipath interference and is appropriate for a high-speed transmission has been adopted for a downlink communication scheme of LTE. Furthermore, as a result of taking into consideration the cost and power consumption of a mobile station device, a discrete Fourier transform (DFT)-spread OFDM scheme of a single carrier-frequency division multiple access (SC-FDMA) scheme that can reduce a peak to average power ratio (PAPR) of a transmit signal has been adopted for an uplink communication scheme.

Furthermore, in the 3GPP, LTE-Advanced (or Advanced-EUTRA), which is an enhanced version of LTE, has been continually discussed. In LTE-Advanced, it is assumed that bands with a bandwidth of up to 100 MHz may be used in each an uplink and a downlink so as to perform communication at a maximum transfer rate of 1 Gbps or greater in the downlink and 500 Mbps or greater in the uplink.

It is thought that in LTE-Advanced, a band of up to 100 MHz can be achieved when a plurality of bands compatible with LTE are bundled so as to accommodate even a mobile station device of LTE. Note that in LTE-Advanced, one band of 20 MHz or less of LTE is called a component carrier (CC). The component carrier is also called a cell. Furthermore, bundling of bands of 20 MHz or less is referred to as a carrier aggregation (CA) (NPL 1).

On the other hand, in LTE-Advanced, cost reduction is being considered for a mobile station device corresponding to a particular category such as machine-type communication (MTC) or machine to machine communication (M2M) (NPL 2). Hereinafter, a mobile station device of MTC/M2M or a communication device of MTC/M2M is also referred to as machine type communication user equipment (MTCUE).

To achieve low-cost MTCUE that complies with the LTE standard and the LTE-Advanced standard, cost reduction methods have been proposed such as narrowing transmission/reception bandwidth, reduction in number of antenna ports/RF chains, reduction of transmission/reception data transfer rate, adoption of a half-duplex frequency division duplex scheme, reduction of transmit/receive power, and extension of discontinuous reception interval. Furthermore, it has also been proposed that as a method of achieving low-cost MTCUE, reduction of maximum bandwidth of a transmission/reception RF circuit and a transmission/reception baseband circuit of MTCUE is effective.

Furthermore, in MTC, a coverage enhancement for extending the transmission/reception range of MTCUE is also being considered along with cost reduction. To enhance the coverage, it is expected that a base station device repeatedly transmits downlink data or a downlink signal to MTCUE and the MTCUE repeatedly transmits uplink data or an uplink signal to the base station device (NPL 3).

For example, the base station device repeatedly transmits a physical broadcast channel PBCH to the MTCUE a plurality of times within 40 ms. Furthermore, in a random access procedure, the MTCUE uses a plurality of physical random access channels PRACH to repeatedly transmit the same random access preamble. Then, the base station device that receives the random access preamble repeatedly transmits a random access response message. Note that the base station device announces the repetition number to MTCUE within a cell on a broadcast channel BCH or individually announces the same to MTCUE (NPL 3).

For example, the number of repetitive transmissions of the random access preamble or the number of repetitive transmissions of the random access response message is announced on the broadcast channel BCH. Furthermore, the number of repetitive transmissions of the random access preamble includes a plurality of types of numbers of repetitive transmissions, and it is thought that the MTCUE can select one number of repetitive transmissions from the plurality of types of numbers of repetitive transmissions.

CITATION LIST

Non Patent Literature

NPL 1: 3GPP TS (Technical Specification) 36.300, V11.5.0 (2013-03), Evolved Universal Terrestrial Radio Access (E-UTRA) and Evolved Universal Terrestrial Radio Access Network (E-UTRAN), Overall description Stage2

NPL 2: 3GPP TR (Technical Report) 36.888, V12.0.0 (2013-06), Study on provision of low-cost Machine-Type Communications (MTC) User Equipments (UEs) based on LTE (release 12)

NPL 3: "Rel-12 agreements for MTC", R1-143784, 3GPP TSG-RAN WG1 Meeting #78bis Ljubljana, Slovenia, 6-10 Oct. 2014

SUMMARY OF INVENTION

Technical Problem

However, when data is repeatedly transmitted (or received), it is necessary that a conventional procedure (for example, a random access procedure) related to repetitive transmission (reception) of data also follows repetition control.

Some aspects of the present invention have been made in view of such a situation, and an object thereof is to provide a radio communication system, a base station device, a mobile station device, a radio communication method, and an integrated circuit by which the mobile station device and the base station device can effectively perform repetitive transmission and reception.

Solution to Problem (1) A terminal device according to a first aspect of the present invention is a terminal device configured to communicate with a base station device. The terminal device is configured to: receive, from the base station device, random access common information including information on a random access response reception and information on a contention resolution message reception for each repetition level; select a random access preamble corresponding to a repetition level using the random access common information; and select a contention resolution timer value corresponding to the repetition level selected from the random access common information.

(2) Furthermore, in the terminal device according to the first aspect of the present invention, the random access common information may be acquired from system information of a cell corresponding to a random access procedure for each repetition level.

(3) A base station device according to a second aspect of the present invention is a base station device configured to communicate with a terminal device. The base station device is configured to: transmit, to the terminal device, random access common information including information on a random access response reception and information on a contention resolution message reception for each repetition level; and receive a random access preamble corresponding to a repetition level, selected on the basis of the random access common information, by the terminal device.

(4) Furthermore, in the base station device according to the second aspect of the present invention, the random access common information may be included in the system information for the terminal device corresponding to a random access procedure for each repetition level and transmitted.

(5) A radio communication method according to a third aspect of the present invention is a communication method of a terminal device configured to communicate with a base station device. The method includes the steps of: receiving random access common information including information on a random access response reception and information on a contention resolution message reception for each repetition level from the base station device; selecting a random access preamble corresponding to a repetition level using random access common information; and selecting a contention resolution timer value corresponding to the repetition level selected from the random access common information.

(6) A radio communication method according to a fourth aspect of the present invention is a communication method of a base station device configured to communicate with a terminal device. The method includes the steps of: transmitting to the terminal device random access common information including information on a random access response reception and information on a contention resolution message reception for each repetition level; and receiving a random access preamble corresponding to a repetition level, selected on the basis of the random access common information, by the terminal device.

(7) An integrated circuit according to a fifth aspect of the present invention is an integrated circuit applied to a terminal device configured to communicate with a base station device. The integrated circuit includes: a unit configured to receive random access common information including information on a random access response reception and information on a contention resolution message reception for each repetition level from the base station device; a unit configured to select a random access preamble corresponding to a repetition level using the random access common information; and a unit configured to select a contention resolution timer value corresponding to the repetition level selected from the random access common information.

(8) An integrated circuit according to a sixth aspect of the present invention is an integrated circuit applied to a base station device configured to communicate with a terminal device. The integrated circuit includes: a unit configured to transmit to the terminal device random access common information including information on a random access response reception and information on a contention resolution message reception for each repetition level; and a unit configured to receive a random access preamble corresponding to a repetition level, selected on the basis of the random access common information, by the terminal device.

Advantageous Effects of Invention

According to some aspects of the present invention, it is possible to perform effective repetitive transmission and reception control in a mobile station device. Furthermore, a base station device can perform effective data scheduling for a mobile station device.

DESCRIPTION OF EMBODIMENTS

An OFDM scheme is adopted for the downlink of LTE. Furthermore, a single carrier communication scheme of a DFT-spread OFDM scheme is adopted for the uplink of LTE.

Figure 3:
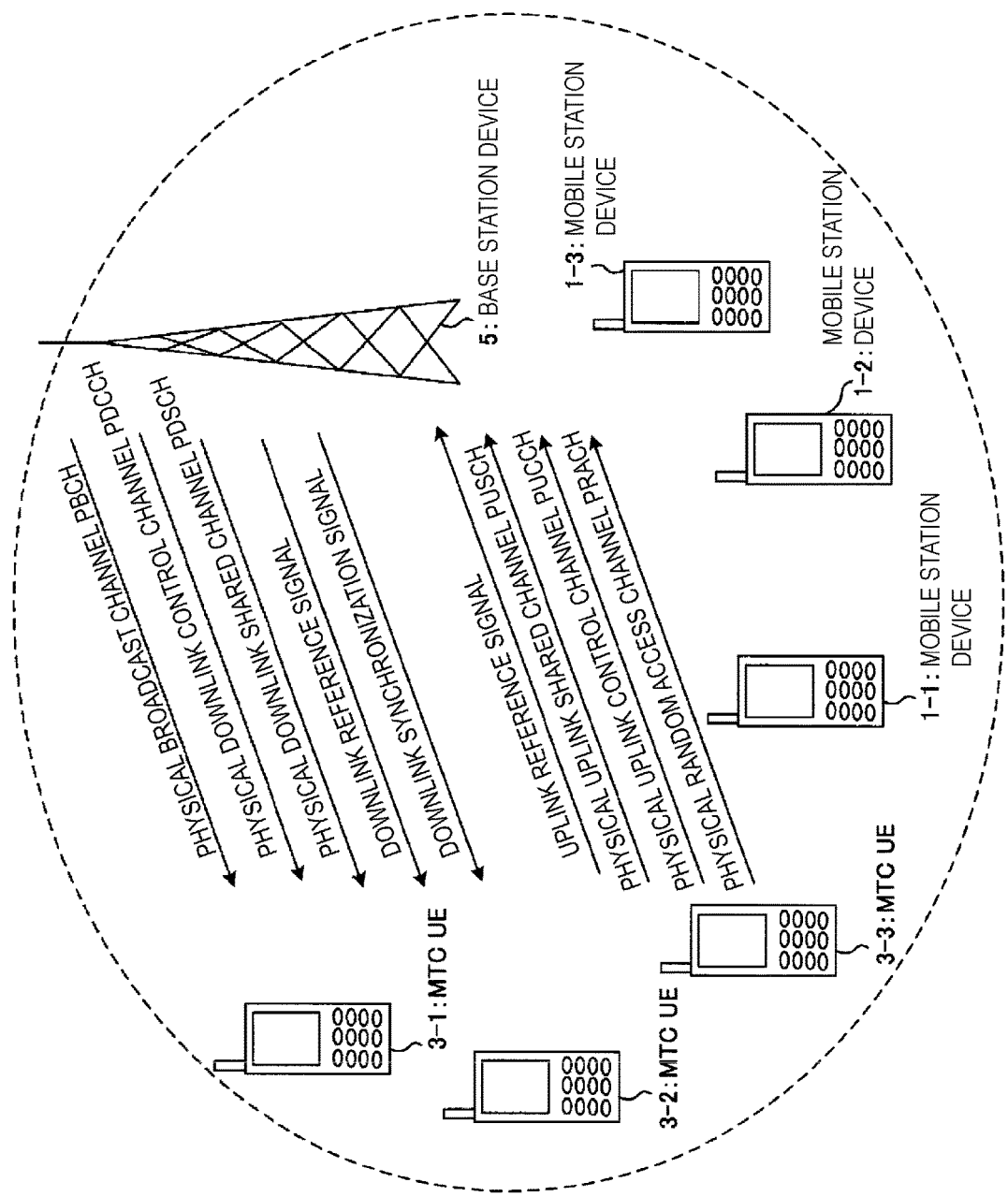
FIG. 3 is a diagram illustrating an example of a constitution of a physical channel in LTE.

FIG. 3 is a diagram illustrating a constitution of a physical channel of LTE. A downlink physical channel is constituted by a physical downlink shared channel PDSCH, a physical downlink control channel PDCCH, and a physical broadcast channel PBCH. In addition, the downlink has physical signals such as a downlink synchronization signal and a downlink reference signal (NPL 1).

An uplink physical channel is constituted by a physical random access channel PRACH, a physical uplink shared channel PUSCH and a physical uplink control channel PUCCH. In addition, the uplink has a physical signal such as an uplink reference signal. The uplink reference signal includes a demodulation reference signal (DRS) and a sounding reference signal (SRS). The sounding reference signal further includes a periodic sounding reference signal (Periodic SRS) and an aperiodic sounding reference signal (Aperiodic SRS). Hereinafter, unless otherwise specified, the sounding reference signal indicates a periodic sounding reference signal (NPL 1).

Figure 4:
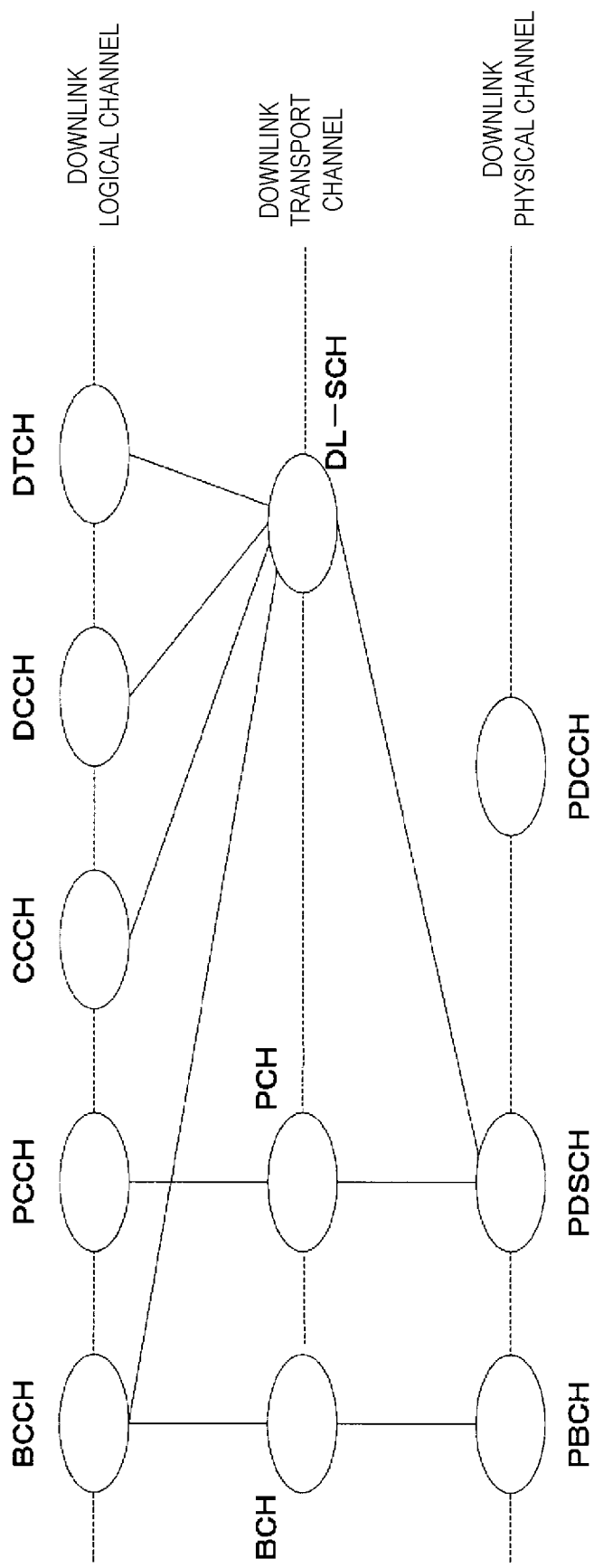
FIG. 4 is a diagram illustrating an example of a constitution of a downlink channel in LTE.

FIG. 4 is a diagram illustrating a constitution of a downlink channel of LTE. The downlink channel illustrated in FIG. 4 is constituted by a logical channel, a transport channel, and a physical channel. The logical channel defines a type of transmission service for data transmitted and received on a medium access control (MAC) layer. The transport channel defines properties of data transmitted in a radio interface and the way in which the data is transmitted. The physical channel is a physical channel on which to transport data transmitted to a physical layer by the transport channel.

The downlink logical channel includes a broadcast control channel BCCH, a paging control channel PCCH, a common control channel CCCH, a dedicated control channel DCCH, and a dedicated traffic channel DTCH.

The downlink transport channel includes a broadcast channel BCH, a paging channel PCH, and a downlink shared channel DL-SCH.

The downlink physical channel includes a physical broadcast channel PBCH, a physical downlink control channel PDCCH, and a physical downlink shared channel PDSCH. These channels are transmitted and received between a base station device and a mobile station device.

Next, the logical channel will be described. The broadcast control channel BCCH is a downlink channel used for broadcasting system information. The paging control channel PCCH is a downlink channel used for transmitting paging information, and is used when a network does not know a cell location of a mobile station device.

The common control channel CCCH is a channel used for transmitting control information between a mobile station device and a network and is used by a mobile station device that does not have a radio resource control (RRC) connection with the network.

The dedicated control channel DCCH is a point-to-point bidirectional channel, and is a channel utilized for transmitting individual control information between a mobile station device and a network. The dedicated control channel DCCH is used by a mobile station device having an RRC connection. The dedicated traffic channel DTCH is a point-to-point bidirectional channel or a channel dedicated to one mobile station device, and is utilized for transferring user information (unicast data).

Next, the transport channel will be described. The broadcast channel BCH is broadcast to a whole cell in a fixed and predefined transmission format. In the downlink shared channel DL-SCH, a hybrid automatic repeat request (HARQ), dynamic adaptation radio link control, and a discontinuous reception (DRX) are supported and broadcast to a whole cell.

In the paging channel PCH, the DRX is supported and needs to be broadcast to a whole cell. Furthermore, the paging channel PCH is mapped to a physical resource that is dynamically used for a traffic channel or other control channels, that is, the physical downlink shared channel PDSCH.

Next, the physical channel will be described. The physical broadcast channel PBCH maps the broadcast channel BCH in a 40 millisecond period. The physical downlink control channel PDCCH is a channel used to announce to the mobile station device a radio resource assignment (downlink assignment) of the physical downlink shared channel PDSCH, hybrid automatic repeat request (HARQ) information for downlink data, and an uplink transmission grant (uplink grant) that is a radio resource assignment of the physical uplink shared channel PUSCH. The physical downlink shared channel PDSCH is a channel used for transmitting the downlink data or the paging information.

Note that the physical downlink control channel PDCCH is arranged from the top of one subframe to the first to third symbols OFDM of a resource block, and the physical downlink shared channel PDSCH is arranged in the remaining OFDM symbols. One subframe is constituted by two resource blocks, and one frame is constituted by ten subframes. One resource block is constituted by 12 subcarriers and 7 OFDM symbols.

Furthermore, when the base station device announces, to the mobile station device, the radio resource assignment of the physical downlink shared channel PDSCH on the physical downlink control channel PDCCH, a region of the physical downlink shared channel PDSCH assigned to the mobile station device is the physical downlink shared channel PDSCH within the same subframe as that of the physical downlink control channel PDCCH to which the downlink assignment is announced.

Next, a channel mapping will be described. As illustrated in FIG. 4, in the downlink, mapping of the transport channel and the physical channel is performed as follows. The broadcast channel BCH is mapped to the physical broadcast channel PBCH. The paging channel PCH and the downlink shared channel DL-SCH are mapped to the physical downlink shared channel PDSCH. The physical downlink control channel PDCCH is not mapped to any other channel but is used only on a physical channel.

Furthermore, in the downlink, the mapping of the logical channel and the transport channel is performed as follows. The paging control channel PCCH is mapped to the paging channel PCH. The broadcast control channel BCCH is mapped to the broadcast channel BCH and the downlink shared channel DL-SCH. The common control channel CCCH, the dedicated control channel DCCH, and the dedicated traffic channel DTCH are mapped to the downlink shared channel DL-SCH.

Figure 5:
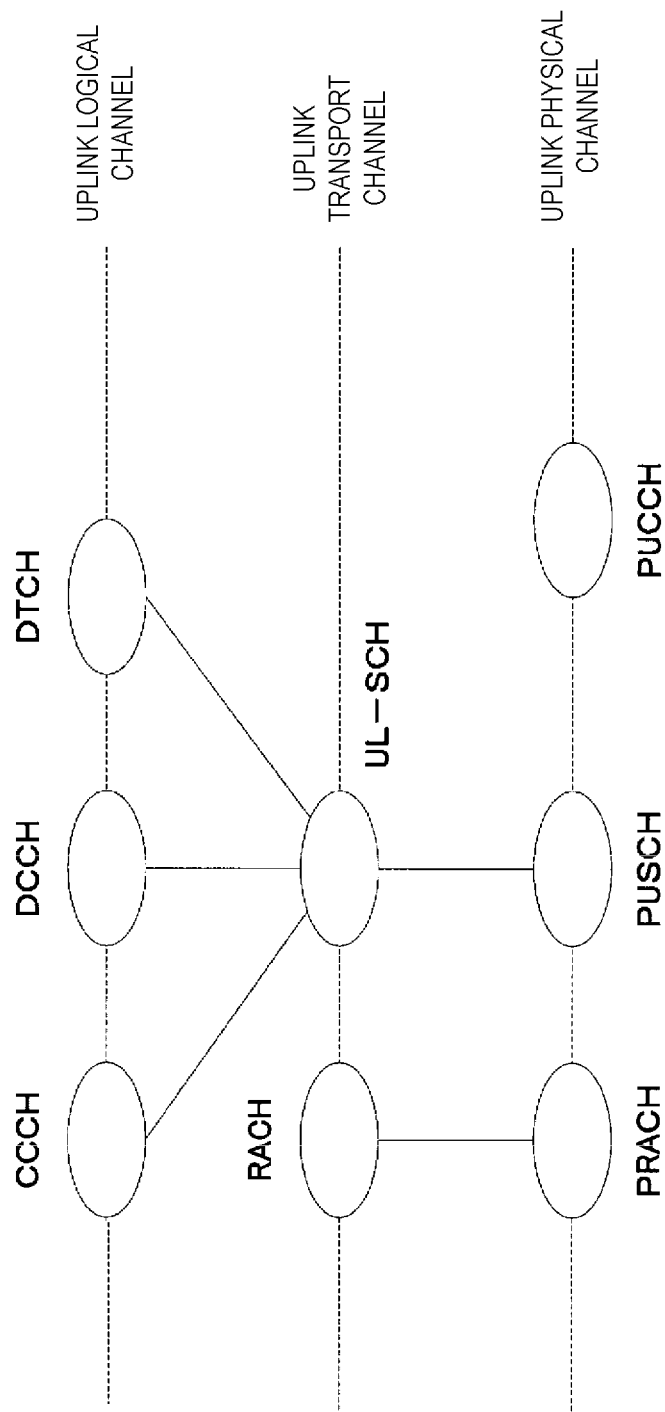
FIG. 5 is a diagram illustrating an example of a constitution of an uplink channel in LTE.

FIG. 5 is a diagram illustrating a constitution of the uplink channel of LTE. The uplink channel illustrated in FIG. 5 is constituted by the logical channel, the transport channel, and the physical channel. The definition of each channel is the same as in the downlink channel.

The uplink logical channel includes a common control channel CCCH, a dedicated control channel DCCH, and a dedicated traffic channel DTCH.

The uplink transport channel includes an uplink shared channel UL-SCH and a random access channel RACH.

The uplink physical channel includes a physical uplink control channel PUCCH, a physical uplink shared channel PUSCH, and a physical random access channel PRACH. These channels are transmitted and received between a base station device and a mobile station device.

Next, the logical channel will be described. The common control channel CCCH is a channel used for transmitting control information between a mobile station device and a network and is used by a mobile station device that does not have a radio resource control (RRC) connection with the network.

The dedicated control channel DCCH is a point-to-point bidirectional channel, and is a channel utilized for transmitting individual control information between a mobile station device and a network. The dedicated control channel DCCH is used by a mobile station device having an RRC connection. The dedicated traffic channel DTCH is a point-to-point bidirectional channel, or a channel dedicated to one mobile station device, and is utilized for transferring user information (unicast data).

Next, the transport channel will be described. In the uplink shared channel UL-SCH, a hybrid automatic repeat request (HARQ), dynamic adaptation radio link control, and a discontinuous transmission (DTX) are supported. In the random access channel RACH, limited control information is transmitted.

Next, the physical channels will be described. The physical uplink control channel PUCCH is a channel used to announce, to a base station device, response information (acknowledge (ACK)/negative acknowledge (NACK)) to downlink data, downlink radio quality information, and a transmission request (scheduling request (SR)) of uplink data. The physical uplink shared channel PUSCH is a channel used for transmitting uplink data. The physical random access channel PRACH is mainly used for transmitting a random access preamble for acquiring transmission timing information from a mobile station device to a base station device. The random access preamble transmission is performed in a random access procedure.

Next, a channel mapping will be described. As illustrated in FIG. 5, in uplink, mapping of the transport channel and the physical channel is performed as follows. The uplink shared channel UL-SCH is mapped to the physical uplink shared channel PUSCH. The random access channel RACH is mapped to the physical random access channel PRACH. The physical uplink control channel PUCCH is not mapped to any other channel but is used only on a physical channel.

Furthermore, in the uplink, mapping of the logical channel and the transport channel is performed as follows. The common control channel CCCH, the dedicated control channel DCCH, and the dedicated traffic channel DTCH are mapped to the uplink shared channel UL-SCH.

Figure 6:
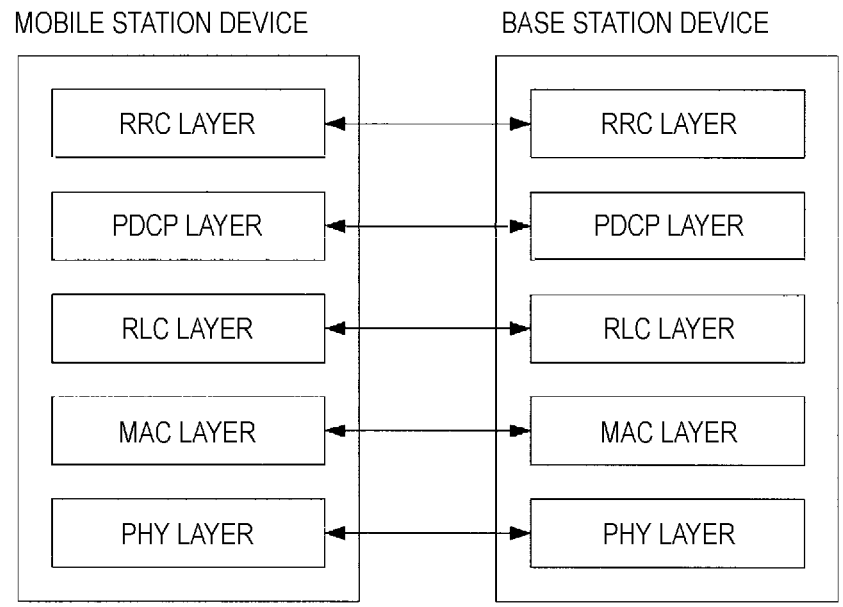
FIG. 6 is a diagram illustrating an example of a constitution of a communication protocol related to control information for a base station device and a mobile station device.
Figure 7:
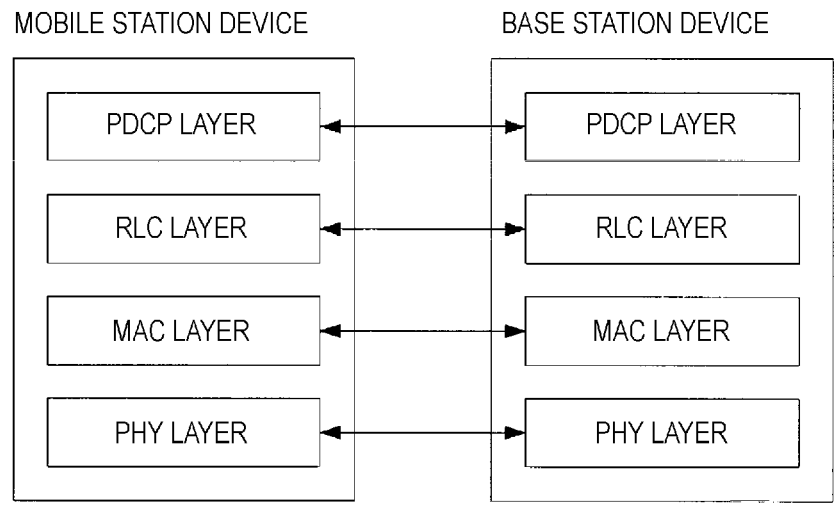
FIG. 7 is a diagram illustrating an example of constitution of a communication protocol related to the base station device and user information of the mobile station device.

FIG. 6 is a protocol stack handling control data of a mobile station device and a base station device of LTE. FIG. 7 is a protocol stack handling user data of a mobile station device and a base station device of LTE. FIG. 6 and FIG. 7 will be described below.

A physical layer (PHY layer) provides a transmission service to an upper layer by utilizing the physical channel. The PHY layer is connected by the transport channel to an upper medium access control layer (MAC layer). Through the transport channel, data is moved between layers, the MAC layer and the PHY layer. Between the PHY layers of the mobile station device and the base station device, data is transmitted and received via the physical channel. There may be, in each hierarchy, a plurality of entities configured to execute a role in each hierarchy.

The MAC layer maps various logical channels to various transport channels. The MAC layer is connected by the logical channel to an upper radio link control layer (RLC layer). The logical channel is roughly divided according to the type of information transmitted and is divided into a control channel on which to transmit control information and a traffic channel on which to transmit user information. The MAC layer has a function of controlling the PHY layer to perform a discontinuous reception/transmission (DRX/DTX), a function of announcing information on transmit power, a function of performing HARQ control, and the like.

Furthermore, the MAC layer has a function of announcing the data volume of a transmission buffer corresponding to each logical channel (buffer status report: BSR) and a function of transmitting a radio resource request for transmitting uplink data (scheduling request). The MAC layer executes a random access procedure when performing an initial access, a scheduling request, and the like.

An RLC layer segments and concatenates data received from an upper layer, and adjusts the data size for a lower layer to appropriately transmit the data. Furthermore, the RLC layer has a function of ensuring a quality of service (QoS) requested by each piece of data. That is, the RLC layer has a function of re-transmission control of data and the like.

A packet data convergence protocol layer (PDCP layer) has a header compression function of compressing unnecessary control information in order to efficiently transmit IP packets that is user data in a radio zone. Furthermore, the PDCP layer also has a function of encrypting the data.

In a radio resource control layer (RRC layer), only control information is defined. The RRC layer configures/reconfigures a radio bearer (RB), and controls the logical channel, the transport channel, and the physical channel. The RB is divided into a signaling radio bearer (SRB) and a data radio bearer (DRB), and the SRB is used as a pathway to transmit an RRC message that is control information. The DRB is used as a pathway to transmit user information. The configuration for each RB is performed between the RRC layers of a base station device and a mobile station device.

Note that the PHY layer corresponds to a physical layer which is a first layer in a hierarchical structure of a conventional open systems interconnection (OSI) model, the MAC layer, the RLC layer, and the PDCP layer correspond to a data link layer which is a second layer of the OSI model, and the RRC layer corresponds to a network layer which is a third layer of the OSI model.

The random access procedure will be described. The random access process procedure includes two access procedures, that is, a contention based random access procedure and a non-contention based random access procedure (NPL 1).

Figure 8:
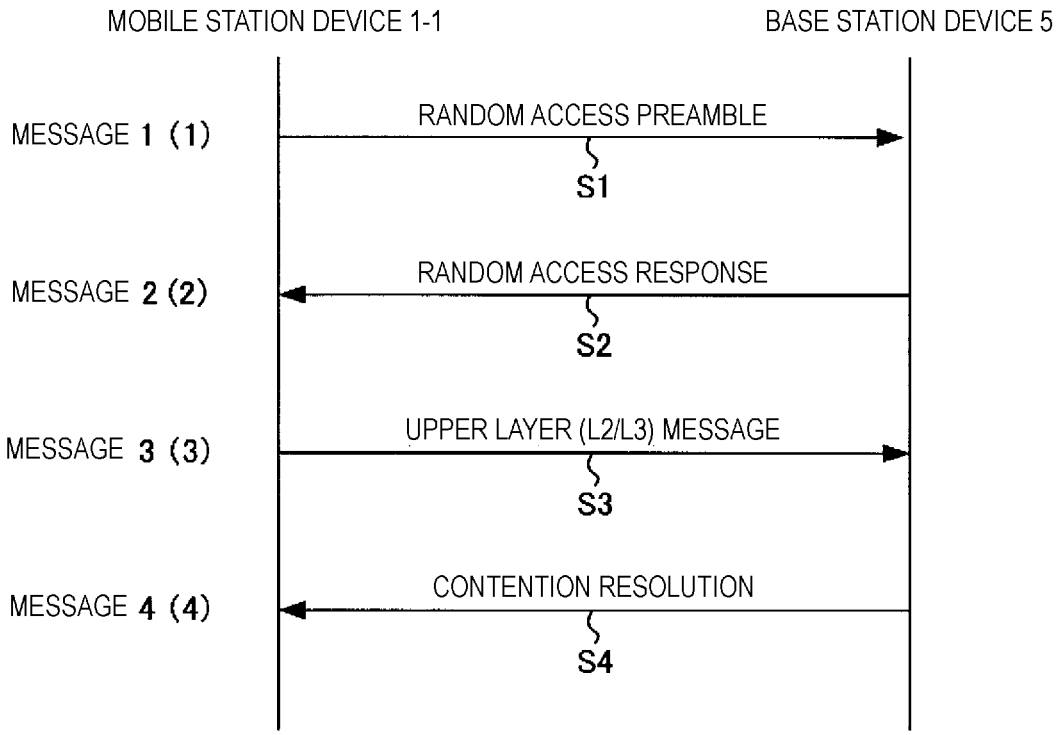
FIG. 8 is a diagram illustrating a contention based random access procedure.

FIG. 8 is a diagram illustrating the contention based random access procedure. The contention based random access procedure is a random access where a contention (collision) may occur between mobile station devices. The contention based random access procedure is performed, for example, during an initial access from a non connection (communication) state with a base station device or in a scheduling request when there occurs uplink data transmission to a mobile station device in a state where despite being in a connection state with a base station device, the uplink is out of synchronization.

Figure 9:
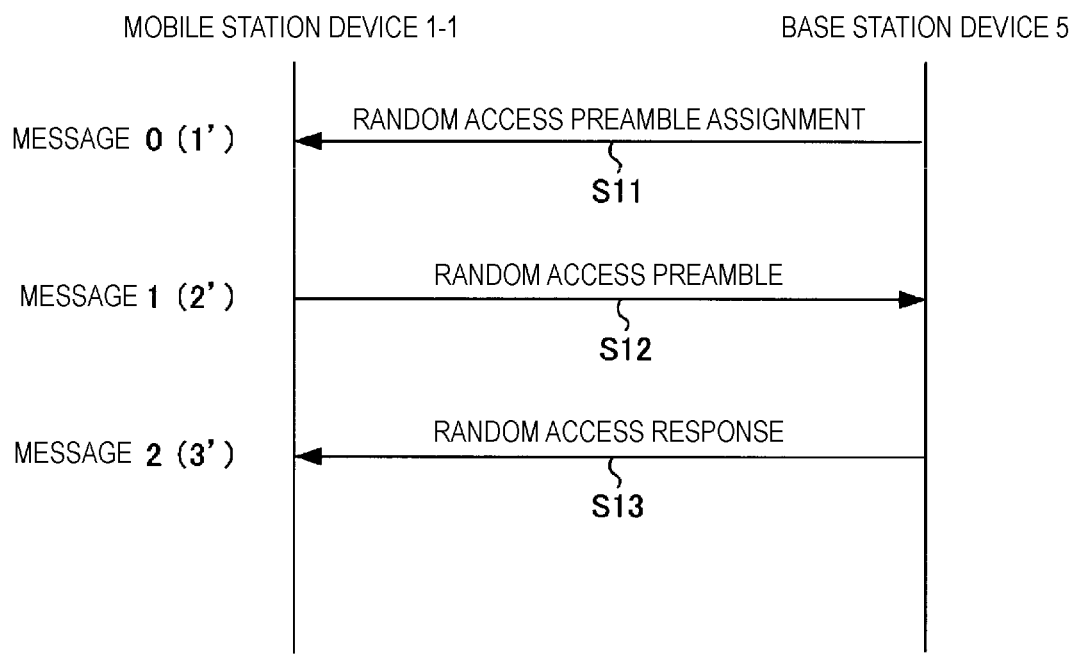
FIG. 9 is a diagram illustrating a non-contention based random access procedure.

FIG. 9 is a diagram illustrating the non-contention based random access procedure. The non-contention based random access procedure is a random access where no contention takes place between mobile station devices. In a special case when handover and a transmission timing of a mobile station device are not valid because of a need to quickly synchronize the uplink between the mobile station device and the base station device when the base station device and the mobile station device are being connected but the uplink is out of synchronization, the mobile station device is instructed by the base station device to initiate the random access (NPL 1). The non-contention based random access procedure is instructed by a message of the radio resource control (RRC) layer (layer 3) and control data of the physical downlink control channel PDCCH.

The contention based random access procedure will be briefly described referring to FIG. 8. First, a mobile station device 1-1 transmits a random access preamble to a base station device 5 (message 1:(1), step S1). Then, the base station device 5 that receives the random access preamble transmits a response (a random access response message) to the random access preamble, to the mobile station device 1-1 (message 2:(2), step S2). The mobile station device 1-1 transmits a message of an upper layer (layer 2/layer 3) on the basis of scheduling information included in the random access response message (message 3:(3), step S3). The base station device 5 transmits a contention confirmation message to the mobile station device 1-1 that can receive the upper layer message of (3) (message 4:(4), step S4). Note that the contention based random access is also referred to as a random preamble transmission.

The non-contention based random access procedure will be briefly described referring to FIG. 9. First, the base station device 5 announces to the mobile station device 1-1 a preamble number (or a sequence number) and a random access channel number to be used (message 0:(1'), step S11). The mobile station device 1-1 transmits the random access preamble of the designated preamble number to a designated random access channel RACH (message 1:(2'), step S12). Then, the base station device 5 that receives the random access preamble transmits a response (random access response message) to the random access preamble, to the mobile station device 1-1 (message 2: (3'), step S13). However, when a value of the announced preamble number is zero, the contention based random access procedure is performed. Note that the non-contention based random access is also referred to as a dedicated preamble transmission.

Figure 10:
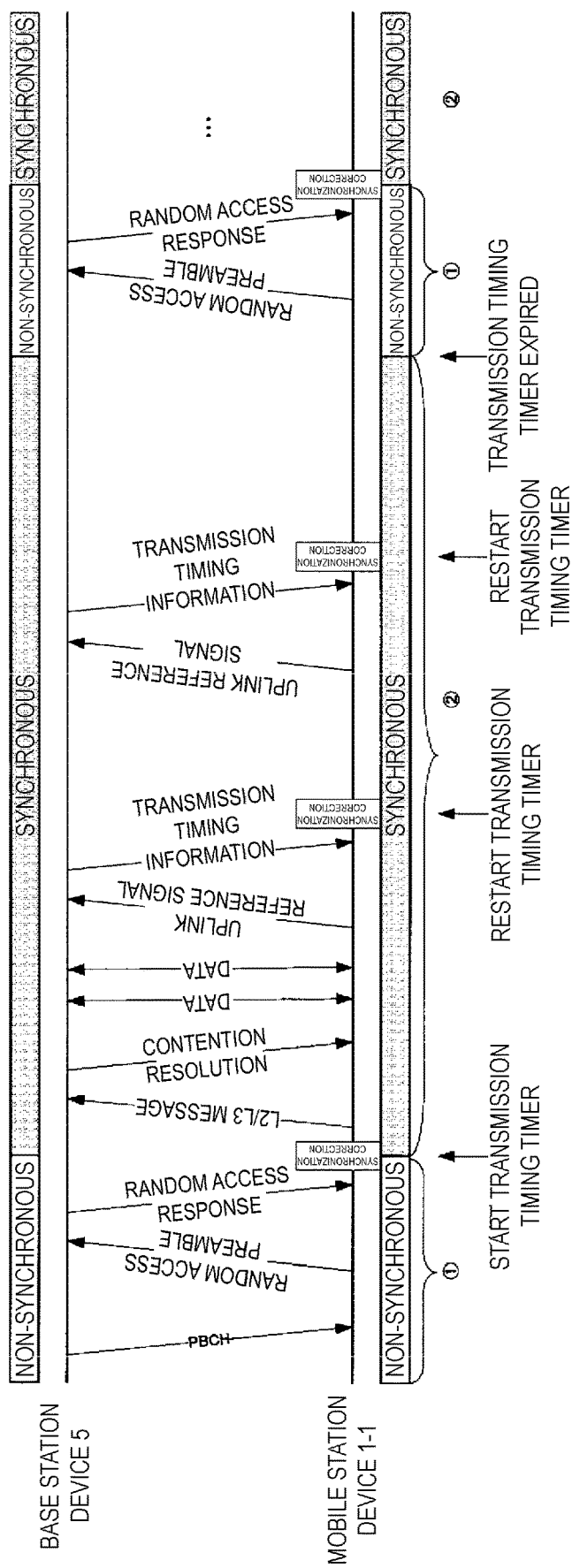
FIG. 10 is a diagram illustrating one example of an updating procedure of a transmission timing.

The connection procedure of the mobile station device 1-1 to the base station device 5 is described referring to FIG. 8 and FIG. 10. First, the mobile station device 1-1 obtains the system information of the base station device 5 from the physical broadcast channel PBCH and the like and executes the random access procedure from random access related information included in the system information to connect with the base station device 5. The mobile station device 1-1 generates the random access preamble from the random access related information and the like of the system information. Then, the mobile station device 1-1 transmits the random access preamble on the random access channel RACH (message 1: (1)).

Upon detecting the random access preamble from the mobile station device 1-1, the base station device 5 calculates the displacement amount of the transmission timing between the mobile station device 1-1 and the base station device 5 from the random access preamble, performs scheduling (designation of an uplink radio resource location (location of the physical uplink shared channel PUSCH), a transmission format (message size) and the like) for transmitting the Layer 2 (L2)/Layer 3 (L3) message, assigns temporary cell-radio network temporary identity (C-RNTI) (mobile station device identification information), arranges random access-radio network temporary identity (RA-RNTI) indicating a response (random access response message) destined for the mobile station device 1-1 that has transmitted the random access preamble of the random access channel RACH to the physical downlink control channel PDCCH, and transmits the random access response message including the transmission timing information, the scheduling information, and information on the temporary C-RNTI and the received random access preamble, to the physical downlink shared channel PDSCH (message 2: (2)).

Upon detecting that the RA-RNTI is present in the physical downlink control channel PDCCH, the mobile station device 1-1 checks the content of the random access response message arranged in the physical downlink shared channel PDSCH, and when the information on the transmitted random access preamble is included, adjusts the uplink transmission timing from the transmission timing information, and transmits the L2/L3 message including information for identifying the mobile station device 1-1, such as the C-RNTI (or temporary C-RNTI) or international mobile subscriber identity (IMSI) by the scheduled radio resource and transmission format (message 3: (3)).

Upon adjusting the transmission timing, the mobile station device 1-1 starts a transmission timing timer. While the transmission timing timer is operating (or running), the transmission timing becomes valid, and when the transmission timing timer expires or pauses, the transmission timing becomes invalid. While the transmission timing is valid, the mobile station device 1-1 can transmit data to the base station device 5, and when the transmission timing is invalid, the mobile station device 1-1 can transmit the random access preamble only. Furthermore, the period in which the transmission timing is valid is referred to as an uplink synchronization state, and a period in which the transmission timing is invalid is referred to as an uplink non-synchronization state.

After receiving the L2/L3 message from the mobile station device 1-1, the base station device 5 transmits, to the mobile station device 1-1, a contention resolution message for determining whether or not a contention (collision) occurs among the mobile station devices 1-1 to 1-3 by using the C-RNTI (or the temporary C-RNTI) or the IMSI included in the received L2/L3 message (message 4:(4)).

Upon transmitting the L2/L3 message, the mobile station device 1-1 starts the contention resolution timer. Upon receiving the contention resolution message while the contention resolution timer is operating, the mobile station device 1-1 terminates the random access procedure.

Note that when the random access response message that includes the preamble number corresponding to the random access preamble transmitted during a random access response window is not detected, when transmission of the message 3 has failed, or when the identification information of the mobile station device 1-1 is not detected in the contention confirmation message until the contention resolution timer timer expires, the mobile station device 1-1 restarts the connection procedure from the transmission of the random access preamble (message 1: (1)).

Then, when the number of transmissions of the random access preamble exceeds the maximum number of transmissions of the random access preamble indicated in the system information, the mobile station device 1-1 determines that the random access has failed and disconnects the communication with the base station device 5. Note that after the random access procedure is successfully performed, control data for connection is further exchanged between the base station device 5 and the mobile station device 1-1. At this time, the base station device 5 announces, to the mobile station device 1-1, an uplink reference signal to be individually assigned and assignment information of the physical uplink control channel PUCCH.

An update of the uplink transmission timing after the completion of the random access procedure is performed as follows. The base station device 5 measures an uplink reference signal (a reference signal for measurement or a reference signal for demodulation) transmitted from the mobile station device 1-1, calculating the transmission timing, and announces a transmission timing message including the calculated transmission timing information to the mobile station device 1-1, as illustrated in FIG. 10.

After updating the transmission timing indicated by the transmission timing message announced from the base station device 5, the mobile station device 1-1 restarts the transmission timing timer. Note that the base station device 5 also holds the same transmission timing timer as that of the mobile station device 1-1, and when the transmission timing information is transmitted, the transmission timing timer is started or restarted. In this way, the uplink synchronization state is managed between the base station device 5 and the mobile station device 1-1. Note that when the transmission timing timer expires, or when the transmission timing timer is not operating, the transmission timing is invalid.

In the 3GPP, LTE-Advanced, which is further evolved from LTE is also being discussed. In LTE-Advanced, it is assumed that bands with a bandwidth of up to 100 MHz may be used in each the uplink and the downlink so as to perform communication at a maximum transfer rate of 1 Gbps or greater in the downlink and 500 Mbps or greater in the uplink.

Regarding LTE-Advanced, it is thought that a band of up to 100 MHz can be achieved when a plurality of bands of 20 MHz or less of LTE are bundled so as to accommodate even a mobile station device of LTE. Note that in LTE-Advanced, one band of 20 MHz or less of LTE is referred to as a component carrier (CC) (NPL 1).

Furthermore, one downlink component carrier and one uplink component carrier are combined to constitute one cell. Note that only one downlink component carrier can constitute one cell. A plurality of cells are bundled to perform communication between a base station device and a mobile station device via the plurality of cells, which is called a carrier aggregation.

In the carrier aggregation, one base station device allocates a plurality of cells that match with the communication ability and the communication conditions of a mobile station device, in order to perform communication between the mobile station device via the plurality of allocated cells. Note that in the plurality of cells allocated to the mobile station device, one cell is classified as a first cell (primary cell (PCell)) and the other cells as second cells (secondary cells (SCells)). In the first cell, special functions such as assignment of the physical uplink control channel PUCCH are configured.

On the other hand, regarding LTE-Advanced, cost reduction of a mobile station device for a specific category such as a mobile station device corresponding to machine type communication (MTC) or machine to machine (M2M) communication (NPL 2) is being considered. Hereinafter, the mobile station device of MTC/M2M or a communication device of MTC/M2M is also referred to as machine type communication user equipment (MTCUE).

To achieve low-cost MTCUE that complies with the LTE standard and the LTE-Advanced standard, cost reduction methods have been proposed such as narrowing a transmission/reception bandwidth, reduction in number of antenna ports/RF chains, reduction of transmission/reception data transfer rate, adoption of a half-duplex frequency division duplex scheme, reduction of transmit/receive power, and extension of the discontinuous reception interval. Furthermore, as an effective method of achieving low-cost MTCUE, reduction of maximum bandwidth of a transmission/reception RF circuit and a transmission/reception baseband circuit of MTCUE has also been proposed.

Further, to compensate reduction of the transmission/reception properties due to the impact of reduction in the number of antenna ports and the like, it is thought that downlink data or a downlink signal is transmitted to MTCUE repeatedly for one time data transmission, and the MTCUE transmits to the base station device uplink data or an uplink signal repeatedly for one time data transmission.

Furthermore, in discussions regarding MTC, a coverage enhancement for enhancing the transmission/reception range of MTCUE is also being considered along with cost reduction methods. To reduce transmit/receive power and enhance coverage, it is thought that a base station device repeatedly transmits downlink data or a downlink signal to MTCUE for one time data transmission, and the MTCUE repeatedly transmits uplink data or an uplink signal to the base station device for one time data transmission.

The MTCUE repeatedly receives data from the base station device for one time data reception, adds up the repeatedly received data, and demodulates the added data. Furthermore, the base station device also repeatedly receives data from the MTCUE, adds up the repeatedly received data, and demodulates the added data.

For example, the base station device repeatedly transmits a physical broadcast channel PBCH to the MTCUE a numerous times within 40 ms. Furthermore, the base station device repeatedly transmits numerous times the physical downlink shared channel PDSCH, the physical downlink control channel PDCCH, and an enhanced physical downlink control channel EPDCCH to the MTCUE. The MTCUE repeatedly transmits numerous times the physical uplink shared channel PUSCH and the physical uplink control channel PUCCH and the like to the base station device.

Furthermore, in a random access procedure, MTCUE uses a plurality of physical random access channels PRACH to repeatedly transmit the same random access preamble. Then, a base station device that receives the random access preamble repeatedly transmits a random access response message. Furthermore, the message 3 and the contention confirmation message are also repeatedly transmitted. Note that the base station device announces the number of repetitive transmissions and receptions to MTCUE in the cell on the broadcast channel BCH or individually announces to MTCUE (NPL 3).

For example, the number of repetitive transmissions of the random access preamble or the number of repetitive receptions of the random access response message is announced on the broadcast channel BCH. Furthermore, the number of repetitive transmissions of the random access preamble includes a plurality of types of the number of repetitive transmissions, and it is expected that the MTCUE can select one number of repetitive transmissions from the plurality of types of the number of repetitive transmissions. The number of repetitive transmissions configured from the base station device is also referred to as one attempt.

Repetition control for reception of the physical downlink control channel PDCCH, reception of the enhanced physical downlink control channel EPDCCH, transmission of the physical uplink control channel PUCCH, and transmission of the physical random access channel PRACH (or random access preamble) is referred to as repetition, and repetition control for reception of the physical downlink shared channel PDSCH, and transmission of the physical uplink shared channel PUSCH is referred to as bundling.

When the bundling is configured, a bundle size defines the number of subframes in one bundle. A bundling operation relies on an HARQ entity that activates the same HARQ process for each transmission that constitutes the same bundle. In one bundle, HARQ retransmission, which is non-adaptive, is triggered depending on the bundle size without waiting for feedback from a last transmission. HARQ feedback of one bundle is received (HARQ-ACK for PUSCH) or transmitted (HARQ-ACK for PDSCH) and received by a terminal device only for the last subframe of the bundle. The bundling process is performed in the MAC layer.

Note that a mobile station device which is designed for machine type communication (MTC) or machine to machine (M2M) communication, which is adapted to cost reduction and/or coverage enhancement, or an MTC/M2M communication device, is described as machine type communication user equipment (MTCUE), below. However, applications of such mobile station devices are not limited to machine type communication or machine to machine communication. Furthermore, a mobile station device not having characteristics such as cost reduction and coverage enhancement is simply indicated as a mobile station device, below.

Embodiment

Constitution Description

Figure 1:
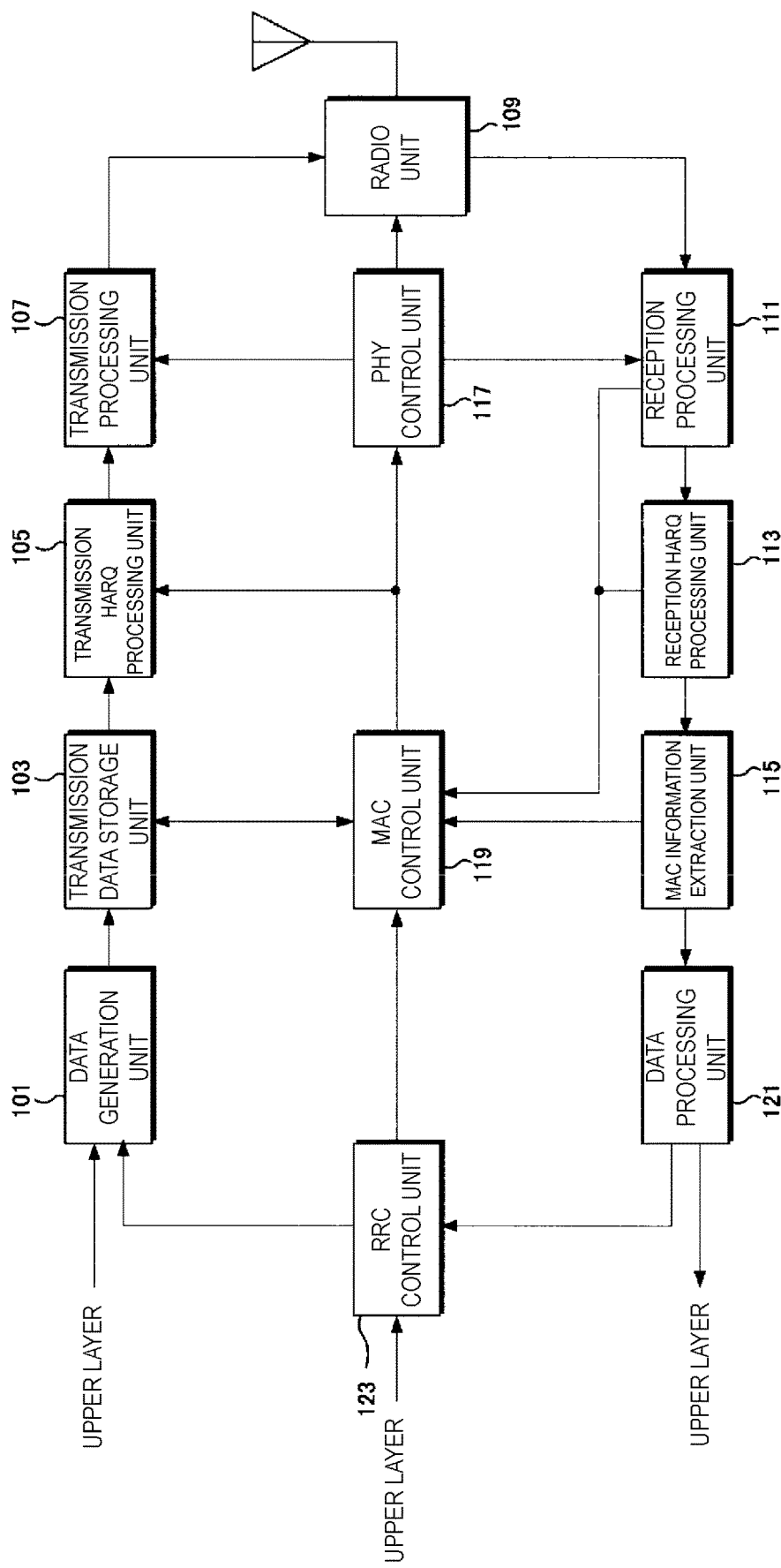
FIG. 1 is a diagram illustrating one example of a constitution of MTCUE according to an embodiment of the present invention.

FIG. 1 is a diagram illustrating the constitution of MTCUE according to an embodiment of the present invention. MTCUEs 3-1 to 3-3 are constituted of: a data generation unit 101, a transmission data storage unit 103, a transmission HARQ processing unit 105, a transmission processing unit 107, a radio unit 109, a reception processing unit 111, a reception HARQ processing unit 113, a MAC information extraction unit 115, a PHY control unit 117, a MAC control unit 119, a data processing unit 121, and an RRC control unit 123.

The user data from the upper layer and the control data from the RRC control unit 123 are input to the data generation unit 101. The data generation unit 101 has functions of the PDCP layer and the RLC layer. The data generation unit 101 performs processing such as header compression of an IP packet of the user data, data encryption, and segmentation and combination of data so as to adjust the data size. The data generation unit 101 outputs the processed data to the transmission data storage unit 103.

The transmission data storage unit 103 accumulates the data input from the data generation unit 101 and outputs the instructed data, by the instructed amount of data, on the basis of an instruction from the MAC control unit 119 to the transmission HARQ processing unit 105. Furthermore, the transmission data storage unit 103 outputs information on the amount of accumulated data to the MAC control unit 119.

The transmission HARQ processing unit 105 performs coding on input data and performs puncture processing on the coded data. Furthermore, the transmission HARQ processing unit 105 outputs the punctured data to the transmission processing unit 107 and saves the coded data. When instructed by the MAC control unit 119 to re-transmit the data, the transmission HARQ processing unit 105 performs puncture processing different from the puncture processing performed previously from the saved (buffered) coded data, and outputs the punctured data to the transmission processing unit 107. When instructed by the MAC control unit 119 to erase the data, the transmission HARQ processing unit 105 erases the data corresponding to the designated cells.

The transmission processing unit 107 performs modulation and coding on the data input from the transmission HARQ processing unit 105. The transmission processing unit 107 performs discrete Fourier transform (DFT)-inverse fast Fourier transform (IFFT) processing on the modulated and coded data, and after processing, inserts a cyclic prefix (CP), arranges the data with the CP being inserted on the physical uplink shared channel (PUSCH) of each component carrier (cell) of the uplink, and outputs the data to the radio unit 109.

Furthermore, when there is a response instruction on the received data from the PHY control unit 117, the transmission processing unit 107 generates an ACK or NACK signal, arranges the generated signal on the physical uplink control channel (PUCCH), and outputs the signal to the radio unit 109. When there is a transmission instruction on the random access preamble from the PHY control unit 117, the transmission processing unit 107 generates the random access preamble, arranges the generated signal on the physical random access channel PRACH, and outputs the signal to the radio unit 109.

The radio unit 109 up-converts the data input from the transmission processing unit 107 to a radio frequency of transmission location information (transmission cell information) instructed by the PHY control unit 117, adjusts the transmit power, and transmits the data from a transmit antenna. Furthermore, the radio unit 109 down-converts a radio signal received from a receive antenna and outputs the signal to the reception processing unit 111. The radio unit 109 configures, as an uplink transmission timing, transmission timing information received from the PHY control unit 117.

The reception processing unit 111 performs fast Fourier transform (FFT) processing, decoding, demodulation processing and the like on the signal input from the radio unit 109. When detecting downlink assignment information of the mobile station device as a result of performing demodulation on the physical downlink control channel PDCCH or the enhanced physical downlink control channel EPDCCH, the reception processing unit 111 performs, on the basis of the downlink assignment information, demodulation of the physical downlink shared channel PDSCH, and notifies the MAC control unit 119 of the acquisition of the downlink assignment information.

The reception processing unit 111 outputs the demodulated data of the physical downlink shared channel PDSCH to the reception HARQ processing unit 113. When detecting uplink transmission grant information (uplink grant) and the response information (ACK/NACK) on the uplink transmission data as a result of performing demodulation of the physical downlink control channel PDCCH or the enhanced physical downlink control channel EPDCCH, the reception processing unit 111 outputs the obtained response information to the MAC control unit 119. Note that the uplink transmission grant information includes a data modulation and coding scheme, data size information, HARQ information, transmission location information, and the like.

The reception HARQ processing unit 113 performs decoding processing on the input data from the reception processing unit 111, and when the decoding processing is successful, outputs the data to the MAC information extraction unit 115. When the decoding process of the input data fails, the reception HARQ processing unit 113 saves the data that has failed in the decoding process. When receiving retransmission data, the reception HARQ processing unit 113 synthesizes the saved data and the retransmission data to perform the decoding processing. Furthermore, the reception HARQ processing unit 113 announces, to the MAC control unit 119, whether or not the decoding processing of the input data is successful.

The MAC information extraction unit 115 extracts the control data of the medium access control layer (MAC layer) from the data input from the reception HARQ processing unit 113, and outputs the extracted MAC control information to the MAC control unit 119. The MAC information extraction unit 115 outputs the remaining data to the data processing unit 121. The data processing unit 121 has functions of the PDCP layer and the RLC layer, and performs processing such as a decompression (restoration) function of the compressed IP header, a decoding function of the encrypted data, segmentation and combination of the data, and the like, so as to restore the data to the original form. The data processing unit 121 segments the data into an RRC message and user data, outputs the RRC message to the RRC control unit 123, and outputs the user data to the upper layer.

The PHY control unit 117 controls, according to an instruction from the MAC control unit 119, the transmission processing unit 107, the radio unit 109, and the reception processing unit 111. The PHY control unit 117 announces to the transmission processing unit 107 the modulation and coding scheme announced from the MAC control unit 119 and the modulation and coding scheme from the transmit power information, and announces to the radio unit 109 the frequency information of the transmission cell and the transmit power information thereof.

Furthermore, according to an instruction from the MAC control unit 119, the PHY control unit 117 performs ON/OFF control of power source (of power supply) of the transmission processing unit 107, the radio unit 109, and the reception processing unit 111. The ON/OFF control indicates power saving control including lowering the supplied power to standby power. The PHY control unit 117 controls the transmission processing unit 107 and the reception processing unit 111 on the basis of the number of repetitive transmissions and receptions announced from the RRC control unit 123.

The MAC control unit 119 has a function of the MAC layer and controls the MAC layer on the basis of information obtained from the RRC control unit 123, the lower layer, and the like. The MAC control unit 119 determines, on the basis of a data transmission control configuration designated from the RRC control unit 123, data amount information obtained from the transmission data storage unit 103, and the uplink transmission grant information obtained from the reception processing unit 111, a data transmission priority, and announces information on the data to be transmitted, to the transmission data storage unit 103. Furthermore, the MAC control unit 119 announces the HARQ information to the transmission HARQ processing unit 105, and outputs the modulation and coding scheme to the PHY control unit 117.

Furthermore, when obtaining the response information to the uplink transmission data from the reception processing unit 111 and the response information indicates a negative acknowledgment (NACK), the MAC control unit 119 instructs the transmission HARQ processing unit 105 and the PHY control unit 117 to retransmit the data. The MAC control unit 119 instructs, when obtaining information on whether or not the data decoding processing is successful from the reception HARQ processing unit 113, the PHY control unit 117 to transmit an ACK or NACK signal.

When obtaining discontinuous reception (DRX) control information in the MAC control information input from the MAC information extraction unit 115, the MAC control unit 119 controls the radio unit 109 to perform discontinuous reception control and the PHY control unit 117 to perform operation start/operation stop control on the transmission processing unit 107 and the reception processing unit 111.

Furthermore, the MAC control unit 119 executes the random access procedure. The MAC control unit 119 performs processing such as selecting a random access preamble, reception processing of a random access response message, and managing the contention resolution timer.

The MAC control unit 119 obtains transmission timing timer information from the RRC control unit 123. The MAC control unit 119 uses the transmission timing timer to manage the validity or invalidity of an uplink transmission timing. The MAC control unit 119 outputs the transmission timing information included in the transmission timing message out of the MAC control information input from the MAC information extraction unit 115, to the PHY control unit 117. The MAC control unit 119 starts or restarts the transmission timing timer when applying the transmission timing.

The MAC control unit 119 instructs the transmission HARQ processing unit 105 to erase the saved data when the transmission timing timer expires. The MAC control unit 119 announces to the RRC control unit 123 the release of the radio resources of the physical uplink control channel PUCCH and the uplink sounding reference signal. Furthermore, the MAC control unit 119 discards the uplink transmission grant information.

Furthermore, the MAC control unit 119 uses the repetition control timer information obtained from the RRC control unit 123 to manage the repetitive transmission and reception control. When obtaining control information for instructing the start or restart of the repetition control timer out of the MAC control information input from the MAC information extraction unit 115, the MAC control unit 119 starts or restarts the repetition control timer. Furthermore, the MAC control unit 119 announces to the RRC control unit 123 that the repetition control timer has expired. Note that the repetition control timer can be managed by the RRC control unit 123.

The MAC control unit 119 creates a buffer status report (BSR) which is information on the amount of data accumulated in the transmission data storage unit 103 and outputs the report to the transmission data storage unit 103. Furthermore, the MAC control unit 119 creates a power headroom report (PHR) which is transmit power information and outputs the report to the transmission data storage unit 103.

The RRC control unit 123 performs various types of configurations for performing communication with the base station device 5 such as processing of the connecting and disconnecting with the base station device 5 and the data transmission control configuration for the control data and the user data. The RRC control unit 123 exchanges information with upper layers associated with the various types of configurations and controls lower layers associated with the various types of configurations.

The RRC control unit 123 creates an RRC message and outputs the created RRC message to the data generation unit 101. The RRC control unit 123 analyzes an RRC message input from the data processing unit 121. The RRC control unit 123 creates a message indicating a transmission capability of the MTCUE and outputs the message to the data generation unit 101. Furthermore, the RRC control unit 123 outputs information needed for the MAC layer to the MAC control unit 119 and outputs information needed for the physical layer to the PHY control unit 117.

The RRC control unit 123 outputs the transmission timing timer information to the MAC control unit 119 when obtaining the transmission timing timer information. When announced by the MAC control unit 119 the release of the physical uplink channel PUCCH or the uplink sounding reference signal, the RRC control unit 123 releases the assigned physical uplink control channel PUCCH and the uplink sounding reference signal and instructs the PHY control unit 117 to release the physical uplink control channel PUCCH and the uplink sounding reference signal.

The RRC control unit 123 outputs, when obtaining the repetitive transmission and reception control message, the number of repetitive transmissions and receptions and the repetition control timer information to the MAC control unit 119 and the PHY control unit 117. The RRC control unit 123 announces, when the repetition control timer expires, one or the maximum number of repetitive transmissions and receptions to the MAC control unit 119 and the PHY control unit 117.

Note that the transmission processing unit 107, the radio unit 109, the reception processing unit 111, and the PHY control unit 117 perform operations of the physical layers, the transmission data storage unit 103, the transmission HARQ processing unit 105, the reception HARQ processing unit 113, the MAC information extraction unit 115, and the MAC control unit 119 perform operations of the MAC layer, the data generation unit 101 and the data processing unit 121 perform operation of the RLC layer and the PDCP layer, and the RRC control unit 123 performs operation of the RRC layer.

Figure 2:
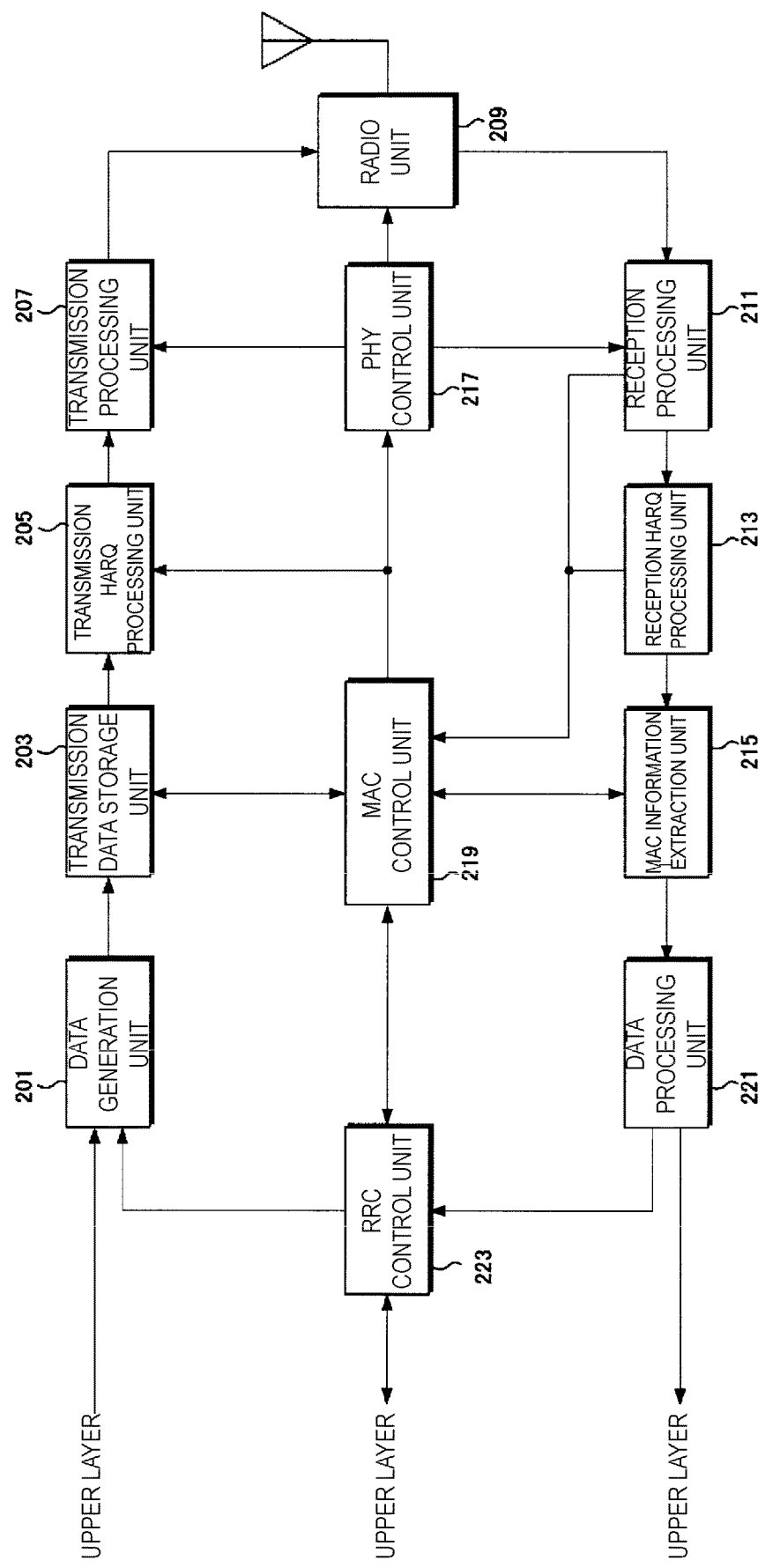
FIG. 2 is a diagram illustrating one example of a constitution of a base station device according to an embodiment of the present invention.

FIG. 2 is a diagram illustrating a constitution of the base station device according to an embodiment of the present invention. The base station device 5 is constituted by: a data generation unit 201, a transmission data storage unit 203, a transmission HARQ processing unit 205, a transmission processing unit 207, a radio unit 209, a reception processing unit 211, a reception HARQ processing unit 213, a MAC information extraction unit 215, a PHY control unit 217, a MAC control unit 219, a data processing unit 221, and an RRC control unit 223.

The user data from the upper layer and the control data from the RRC control unit 223 are input to the data generation unit 201. The data generation unit 201 functions as the PDCP layer and the RLC layer and performs processing such as a header compression of an IP packet of the user data, data encryption, and segmentation and combination of the data so as to adjust the data size. The data generation unit 201 outputs the processed data and logical channel information of the data to the transmission data storage unit 203.

The transmission data storage unit 203 accumulates the data input from the data generation unit 201 for each user and outputs the data of the user instructed on the basis of an instruction from the MAC control unit 219 by the instructed amount of data to the transmission HARQ processing unit 205. Furthermore, the transmission data storage unit 203 outputs information on the amount of accumulated data to the MAC control unit 219.

The transmission HARQ processing unit 205 performs coding on the input data and performs puncture processing on the coded data. Furthermore, the transmission HARQ processing unit 205 outputs the punctured data to the transmission processing unit 207 and saves the coded data. The transmission HARQ processing unit 205 performs, when instructed by the MAC control unit 219 to re-transmit the data, puncture processing that is different from the puncture processing performed previously from the saved coded data and outputs the punctured data to the transmission processing unit 207.

The transmission processing unit 207 performs modulation and coding on the data input from the transmission HARQ processing unit 205. The transmission processing unit 207 maps the modulated and coded data to a signal and each channel such as the physical downlink control channel PDCCH, a downlink synchronization signal, the physical broadcast channel PBCH, and the physical downlink shared channel PDSCH of each cell, and performs OFDM signal processing, such as serial/parallel conversion, inverse fast Fourier transform (IFFT), CP insertion, or the like, on the mapped data to generate an OFDM signal.

Then, the transmission processing unit 207 outputs the generated OFDM signal to the radio unit 209. Furthermore, when there is a response instruction on the received data from the MAC control unit 219, the transmission processing unit 207 generates an ACK or NACK signal, arranges the generated signal on the physical downlink control channel PDCCH, and outputs the signal to the radio unit 209.

The radio unit 209 up-converts data input from the transmission processing unit 207 to a radio frequency, adjusts the transmit power to transmit the data from a transmit antenna. Furthermore, the radio unit 209 down-converts a radio signal received from a receive antenna and outputs the signal to the reception processing unit 211. The reception processing unit 211 performs fast Fourier transform (FFT) processing, decoding, demodulation processing, and the like on the signal input from the radio unit 209.

The reception processing unit 211 outputs the data of the physical uplink shared channel PUSCH in the demodulated data, to the reception HARQ processing unit 213. Furthermore, the reception processing unit 211 outputs to the MAC control unit 219 the response information (ACK/NACK) to downlink transmission data, downlink radio quality information (CQI), and uplink transmission request information (scheduling request), of the control data obtained from the physical uplink control channel PUCCH in the demodulated data. Furthermore, the reception processing unit 211 calculates an uplink radio quality from the uplink sounding reference signal of the MTCUE 3-1 and outputs the uplink radio quality information to the RRC control unit 223 and the MAC control unit 219.

When detecting the random access preamble, the reception processing unit 211 calculates the transmission timing from the detected random access preamble to output the number of the detected random access preamble and the calculated transmission timing to the MAC control unit 219. The reception processing unit 211 calculates the transmission timing from the uplink reference signal to output the calculated transmission timing to the MAC control unit 219.

The reception HARQ processing unit 213 performs decoding processing on the input data from the reception processing unit 211, and when the decoding processing is successful, outputs the data to the MAC information extraction unit 215. When the decoding processing on the input data is unsuccessful, the reception HARQ processing unit 213 saves the data that is unsuccessful in the decoding processing. When receiving the re-transmitted data, the reception HARQ processing unit 213 synthesizes the saved data and the re-transmitted data to perform the decoding processing. Furthermore, the reception HARQ processing unit 213 announces whether or not the decoding processing on the input data is successful, to the MAC control unit 219. When instructed by the MAC control unit 219 to erase the data, the reception HARQ processing unit 213 erases the data corresponding to the designated cell.

The MAC information extraction unit 215 extracts the control data of the MAC layer from the data input from the reception HARQ processing unit 213, and outputs the extracted control information to the MAC control unit 219. The MAC information extraction unit 215 outputs the remaining data to the data processing unit 221. The data processing unit 221 has functions of the PDCP layer and the RLC layer, and performs processing such as a decompression (restoration) function of the compressed IP header, a decoding function of the encrypted data, segmentation and combination of the data, and the like, so as to restore the data to the original form. The data processing unit 221 segments the data into an RRC message and user data, outputs the RRC message to the RRC control unit 223 and outputs the user data to the upper layer.

The MAC control unit 219 has a function of the MAC layer and controls the MAC layer on the basis of information obtained from the RRC control unit 223, the lower layer, and the like. The MAC control unit 219 performs downlink and uplink scheduling processing.

The MAC control unit 219 performs downlink and uplink scheduling processing on the basis of the response information (ACK/NACK) on the downlink transmission data input from the reception processing unit 211, the downlink radio quality information (CQI), the uplink radio quality information and the uplink transmission request information (scheduling request), the control information input from the MAC information extraction unit 215 and the data amount information for each user obtained from the transmission data storage unit 203, the number of repetitive transmissions and receptions, and a reception operation state of the MTCUE 3-1. The MAC control unit 219 outputs a schedule result to the transmission processing unit 207. Furthermore, the MAC control unit 219 determines the reception operation state of the MTCUE 3-1 from a discontinuous reception parameter obtained from the RRC control unit 223.

Furthermore, when the MAC control unit 219 obtains the response information to the uplink transmission data from the reception processing unit 211 and the response information indicates a negative acknowledgment (NACK), the MAC control unit 219 instructs the transmission HARQ processing unit 205 and the transmission processing unit 207 to retransmit the data. The MAC control unit 219 instructs, when obtaining information on whether or not the data decoding processing is successful from the reception HARQ processing unit 213, the transmission processing unit 207 to transmit an ACK or NACK signal.

In the case where a random access preamble number and a transmission timing are obtained from the reception processing unit 211, the MAC control unit 219 creates a random access response message, and outputs the random access response message to the transmission data storage unit 203. Furthermore, the MAC control unit 219 creates, when obtaining the transmission timing from the reception processing unit 211, a transmission timing message including the transmission timing, and outputs the transmission timing message to the transmission data storage unit 203.

Note that from the random access preamble number announced from the reception processing unit 211, the MAC control unit 219 determines whether a communication device is MTCUE or a mobile station device. Furthermore, the MAC control unit 219 determines whether or not repetitive transmission or repetitive reception is required for the transmission of the random access response message and the transmission of the contention resolution and the reception of the message 3, and performs scheduling for the transmission of the random access response message, the transmission of the contention resolution, and the reception of the message 3.

Furthermore, the MAC control unit 219 manages the uplink transmission timing. Using the transmission timing timer, the MAC control unit 219 manages the uplink transmission timing of a transmission timing group of the MTCUE 3-1. The MAC control unit 219 starts or restarts the transmission timing timer when transmitting the transmission timing message to the MTCUE 3-1.

The MAC control unit 219 instructs, in the MTCUE 3-1, the reception HARQ processing unit 213 to erase the data saved for the MTCUE 3-1. The MAC control unit 219 announces, to the RRC control unit 223, the release of the radio resources of the physical uplink control channel PUCCH and the uplink sounding reference signal, the radio resources being assigned to the MTCUE 3-1. Furthermore, the MAC control unit 219 stops the scheduling of the uplink data for the MTCUE 3-1.

Furthermore, the MAC control unit 219 uses the repetition control timer obtained from the RRC control unit 223 to control the repetitive transmission and reception. The MAC control unit 219 creates the control information for instructing start or restart of the repetition control timer. When the control information for instructing start or restart of the repetition control timer is transmitted, the MAC control unit 219 starts or restarts the repetition control timer.

The RRC control unit 223 performs various configurations to communicate with the MTCUE 3-1, such as processing of connecting and disconnecting with the MTCUE 3-1, and data transmission control configuration to configure which cell is used to transmit and receive the control data and the user data of the MTCUE 3-1, exchanges information with upper layers associated with the various configurations, and controls lower layers associated with the various configurations.

The RRC control unit 223 creates various RRC messages, and outputs the created RRC messages to the data generation unit 201. The RRC control unit 223 analyzes the RRC message input from the data processing unit 221.

The RRC control unit 223 creates a message including the system information. Note that the RRC control unit 223 may create a message including the system information for the MTCUE 3-1 and a message including the system information for the mobile station device 1-1.

The RRC control unit 223 configures information on the number of repetitive transmissions and receptions (the number of repetitive receptions and the number of repetitive transmissions) on the basis of a measurement report message from the MTCUE 3-1 and/or the uplink radio quality information from the reception processing unit 211. That is, the RRC control unit 223 configures the number of repetitive receptions of the physical downlink shared channel PDSCH, the physical downlink control channel PDCCH, and the enhanced physical downlink control channel EPDCCH, and the number of repetitive transmissions of the physical uplink shared channel PUSCH and the physical uplink control channel PUCCH, for each MTCUE 3-1. The number of repetitive transmissions and receptions may be configured for each uplink and downlink and may be configured for each physical channel. Furthermore, the RRC control unit 223 configures the repetition control timer for the MTCUE 3-1.

Then, the RRC control unit 223 creates a repetitive transmission and reception control message including either one or both of the number of repetitive transmissions and receptions and the repetition control timer, and outputs the repetitive transmission and reception control message to the transmission data storage unit 203.

Furthermore, the RRC control unit 223 announces the number of repetitive receptions, the number of repetitive transmissions, and the repetition control timer configured for the MTCUE 3-1, to the MAC control unit 219 and the PHY control unit 217. The repetitive transmission and reception control message may be an RRC re-configuration message or a new RRC message, for example.

Furthermore, the RRC control unit 223 outputs information needed for the MAC layer to the MAC control unit 219 and outputs information needed for the physical layer to the PHY control unit 217. When the release of the physical uplink control channel PUCCH or the uplink sounding reference signal is announced from the MAC control unit 219, the RRC control unit 223 releases the assigned physical uplink control channel PUCCH and the uplink sounding reference signal, and instructs the PHY control unit 217 to release the physical uplink control channel PUCCH and the uplink sounding reference signal.

Note that the transmission processing unit 207, the radio unit 209, and the reception processing unit 211 perform operations of the PHY layers, the transmission data storage unit 203, the transmission HARQ processing unit 205, the reception HARQ processing unit 213, the MAC information extraction unit 215, and the MAC control unit 219 perform operations of the MAC layer, the data generation unit 201 and the data processing unit 221 perform operations of the RLC layer and the PDCP layer, and the RRC control unit 223 performs operation of the RRC layer.

Operation Description

A radio communication system as described with reference to FIG. 3 to FIG. 10 is assumed. Furthermore, as illustrated in FIG. 3, the base station device 5 communicates with the MTCUEs 3-1, 3-2, and 3-3 or the mobile station devices 1-1, 1-2, and 1-3.

Operations of the MTCUE 3-1 and the base station device 5 will be described. The MTCUE 3-1 performs a cell search to discover one cell of the base station device 5. The MTCUE 3-1 receives the physical broadcast channel PBCH or the like of the cell to obtain system information (physical channel constitution of cells, transmit power information, information on the random access procedure, transmission timing timer information and the like).

Note that information on the random access procedure is constituted by random access channel configuration information including arrangement information of the physical random access channel PRACH and generation information of the random access preamble, and random access common configuration information including selection information of the random access preamble, transmit power information of the random access preamble, information on the reception of the random access response message, information on the transmission of the message 3, and information on the reception of the contention resolution message.

The selection information of the random access preamble may include selection range information of the random access preamble corresponding to the number of repetitive transmissions of the random access preamble. Furthermore, a plurality of pieces of information on the reception of the random access response message corresponding to the number of repetitive transmissions of the random access preamble, information on the transmission of the message 3, and information on the reception of the contention resolution message may be included.

Note that the base station device 5 may divide the system information into system information broadcasted to the MTCUE 3-1 and system information broadcasted to the mobile station device 1-1. Furthermore, the base station device 5 may configure the system information different in content between the system information broadcast to the MTCUE 3-1 and that which is broadcasted to the mobile station device 1-1. For example, the base station device 5 broadcasts, to the mobile station device 1-1, a system information block type 1 that is conventional system information. Furthermore, the base station device 5 may broadcast to the MTCUE 3-1, a system information block type 1A that is new system information.

Then, the MTCUE 3-1 uses the selection information of the random access preamble to select the random access preamble used by the MTCUE 3-1. For example, the MTCUE 3-1 may select, on the basis of the downlink radio quality or the like, the random access preamble and the number of repetitive transmissions of the random access preamble, from the selection range information of the random access preamble.

A maximum value of the number of repetitive transmissions may be configured according to the system information, for each cell. Furthermore, for an initial access, the MTCUE 3-1 uses the resource of the physical random access channel PRACH of the cell to transmit the random access preamble. The random access preamble is transmitted at the same transmit power until the number of repetitive transmissions of the random access preamble transmission is reached.

The number of repetitive transmissions of the random access preamble transmission may be included in the random access common information. Furthermore, the number of repetitive transmissions of the random access preamble transmission may be configured to correspond to the random access preamble selected by the MTCUE 3-1. The selection information of the random access preamble may be constituted by information relating to the random access preamble selected by the mobile station device and information relating to the random access preamble selected by the MTCUE 3-1.

After detecting the random access preamble, the base station device 5 calculates the uplink transmission timing of the MTCUE 3-1 from the received random access preamble, creates the random access response message including the transmission timing information, and repeatedly transmits the physical downlink shared channel PDSCH including the random access response message. The base station device 5 may include the number of repetitive transmissions to the MTCUE 3-1, into the random access response message.

Then, after transmitting the random access preamble, to receive the random access response message, the MTCUE 3-1 monitors random access-radio network temporary identity (RA-RNTI) on the physical downlink control channel PDCCH or the enhanced physical downlink control channel EPDCCH, during a random access response window.

When detecting the RA-RNTI on the physical downlink control channel PDCCH or the enhanced physical downlink control channel EPDCCH, the MTCUE 3-1 receives the physical downlink shared channel PDSCH including the random access response message. Alternatively, the MTCUE 3-1 may attempt to receive the transmitted random access preamble or the physical downlink shared channel PDSCH transmitted in a downlink resource area corresponding to a resource (arrangement information) of the physical random access channel.

When obtaining the random access response message, the MTCUE 3-1 configures, as the uplink transmission timing of the cell, the transmission timing information included in the random access response message, and starts the transmission timing timer. The MTCUE 3-1 repeatedly transmits the message 3, via the cell, to the base station device 5. Note that the MTCUE 3-1 includes content indicating the initial access, into the message 3. When information on the number of repetitive transmissions for the MTCUE 3-1 is configured to the random access response message, the MTCUE 3-1 repeatedly transmits the message 3 until the number of repetitive transmissions configured by the random access response message is reached.

The MTCUE 3-1 starts the contention resolution timer after transmitting the message 3. The MTCUE 3-1 configures an expiration value (configuration value) of the contention resolution timer according to the number of repetitive transmissions of the random access preamble. Note that the contention resolution timer is started at a first transmission of the repetitive transmission of the message 3. Alternatively, the contention resolution timer may be started at the last transmission of the repetitive transmission of the message 3.

Upon receiving the message 3, the base station device 5 repeatedly transmits the contention resolution message to the MTCUE 3-1. Then, upon receiving the contention resolution message from the base station device 5, the MTCUE 3-1 ends the random access procedure.

Note that the MTCUE 3-1 repeatedly receives the random access response message and the contention resolution message. The MTCUE 3-1 repeatedly transmits the message 3. Furthermore, the base station device 5 repeatedly transmits the random access response message and the contention resolution message. The base station device 5 repeatedly receives the message 3.

The number of repetitive transmissions or the number of repetitive receptions for the random access procedure may be configured to correspond to the random access preamble transmitted by the MTCUE 3-1. Furthermore, the number of repetitive transmissions or the number of repetitive receptions for the random access procedure may be each announced by the random access common information of the system information.

For example, the number of repetitive receptions of the random access response message may be included in information about the reception of the random access response message. Furthermore, the number of repetitive receptions of the contention resolution may be included in information about the reception of the contention resolution message.

In addition, the expiration value of the contention resolution timer may be configured to correspond to the number of repetitive transmissions of the random access preamble or the number of repetitive receptions of the random access response message. That is, the MTCUE 3-1 may include a plurality of expiration values of the contention resolution timer to correspond to the number of repetitive transmissions of the random access preamble or the number of repetitive receptions of the random access response message.

Furthermore, the expiration values of the contention resolution timer may be each announced by the system information. For example, when the number of repetitive transmissions of the random access preamble can be selected from three types, that is, 5 times, 10 times, and 20 times, the expiration value of the contention resolution timer may be configured to be selectable uniquely or optionally from a value corresponding to the number of repetitive transmissions, for example, the three types, that include, 100 ms, 200 ms, and 400 ms. Furthermore, the value of the contention resolution timer may be configured uniquely on the basis of a calculation equation corresponding to, for example, the selected number of repetitive transmissions of the random access preamble or the level of the repetition.

The base station device 5 may announce, to the MTCUE 3-1, a plurality of types of expiration values of the contention resolution timer corresponding to the number of repetitive transmissions of the random access preamble as in the above example. Furthermore, the base station device 5 announces, to the MTCUE 3-1, the reference expiration value of the contention resolution timer. The MTCUE 3-1 may calculate the expiration value of the contention resolution timer from the reference expiration value of the contention resolution timer and the number of repetitive transmissions of the random access preamble.

Furthermore, the MTCUE 3-1 may calculate the expiration value of the contention resolution timer from the reference expiration value of the contention resolution timer and the number of repetitive receptions of the contention resolution. Note that the expiration value of the contention resolution timer may be included in information about the reception of the contention resolution message.

Furthermore, the MTCUE 3-1 may calculate also during a random access response window, as in the case of the expiration value of the contention resolution timer, the window according to the number of repetitive transmissions of the random access preamble. Furthermore, a plurality of types of random access response windows may be configured to be selectable according to the number of repetitive transmissions of the access preamble, as in the case of the expiration value of the contention resolution timer. Note that the random access response window may be included in the information about the reception of the random access response message.

Note that when the MTCUE 3-1 cannot receive the random access response message or when the MTCUE 3-1 cannot receive the contention resolution message before the contention resolution timer expires, the MTCUE 3-1 restarts the random access procedure from the selection of the random access preamble.

After the random access procedure has ended, between the base station device 5 and the MTCUE 3-1, data is transmitted and received by using the physical downlink shared channel PDSCH and the physical uplink shared channel PUSCH. Between the base station device 5 and the MTCUE 3-1, repetitive transmission and reception by the physical downlink shared channel PDSCH and the physical uplink shared channel PUSCH is performed.

The number of repetitive transmissions of the physical uplink shared channel PUSCH or the number of repetitive receptions of the physical downlink shared channel PDSCH after the random access procedure is ended may be configured to correspond to the random access preamble. Furthermore, the number of repetitive transmissions or the number of repetitive receptions after the random access procedure has ended may be each announced, in the system information, to the MTCUE 3-1.

The base station device 5 may configure the number of repetitive transmissions or the number of repetitive receptions individually to the MTCUE 3-1. The number of repetitive transmissions or the number of repetitive receptions may be separately configured or configured simultaneously. The base station device 5 may configure each of the numbers of repetitions of the physical downlink control channel PDCCH, the enhanced physical downlink control channel EPDCCH, and the physical uplink control channel PUCCH.

Note that the base station device 5 may determine/change the number of repetitive transmissions or the number of repetitive receptions of the physical downlink shared channel PDSCH and/or the physical uplink shared channel PUSCH, on the basis of an announced radio quality measurement report (measurement report) of the cell of the MTCUE 3-1 and a neighboring cell and the CQI announced from the MTCUE 3-1, or a radio quality of the uplink reference signal (SRS) transmitted from the MTCUE 3-1. For example, the base station device 5 may configure the repetition number so that the base station device 5 increases the repetition number when the radio quality is worsened, and decrease the repetition number when the radio quality is improved.

Furthermore, the base station device 5 may configure a valid period of the number of repetitive transmissions of the physical uplink shared channel PUSCH or the number of repetitive receptions of the physical downlink shared channel PDSCH.

The valid period of the number of repetitive transmissions or the number of repetitive receptions may be controlled by using a timer between the base station device 5 and the MTCUE 3-1. Furthermore, the MTCUE 3-1 and the base station device 5 may each include a timer indicating the valid period of the number of repetitive transmissions and a timer indicating the valid period of the number of repetitive receptions. Note that the timer is referred to as a repetition control timer as described below.

For example, the base station device 5 may announce each of the number of repetitive transmissions of the physical uplink shared channel PUSCH or the number of repetitive receptions of the physical downlink shared channel PDSCH to the MTCUE 3-1 to announce information about the repetition control timer (for example, an expiration value of the repetition control timer). The MTCUE 3-1 configures the number of repetitive transmissions of the physical uplink shared channel PUSCH and the number of repetitive receptions of the physical downlink shared channel PDSCH, and starts the repetition control timer.

During a period of time that the repetition control timer is operating (running), the MTCUE 3-1 transmits the physical uplink shared channel PUSCH or receives the physical downlink shared channel PDSCH by the repetition number configured from the base station device 5. When the repetition control timer expires (or has stopped), the MTCUE 3-1 discards (or deletes, releases, or invalidates) the number of repetitions individually configured from the base station device 5, configures the number of repetitive transmissions of the physical uplink control channel PUCCH and the physical uplink shared channel PUSCH to a level of the prescribed number, and configures the number of repetitive receptions of the physical downlink control channel PDCCH, the enhanced physical downlink control channel EPDCCH, and the physical downlink shared channel PDSCH to a size of the prescribed number.

The prescribed number refers to one time, a default value, a value configured by the system information or the RRC message from the base station device 5, a maximum number of repetitions supported by the cell, or an initial value, for example. Note that the initial value may be announced by the system information or may be previously determined.

When a new repetition number is configured from the base station device 5 during a period of time in which the repetition control timer is running, the MTCUE 3-1 reconfigures the number of repetitive transmissions of the physical uplink shared channel PUSCH or the number of repetitive receptions of the physical downlink shared channel PDSCH, and restarts the repetition control timer.

Note that the base station device 5 may separately announce information indicating the start or the restart of the repetition control timer, to the MTCUE 3-1. When receiving the information indicating the start of the repetition control timer, the MTCUE 3-1 starts or restarts the repetition control timer, and applies the configured repetition number. Furthermore, the base station device 5 may separately announce information indicating the suspension of the repetition control timer, to the MTCUE 3-1.

For example, the base station device 5 announces the number of repetitive transmissions of the physical uplink shared channel PUSCH, the number of repetitive receptions of the physical downlink shared channel PDSCH, or the configuration information of the repetition control timer, by a message of the RRC layer or a message of the MAC layer, to the MTCUE 3-1, and the base station device 5 announces the information indicating the start or the restart of the repetition control timer, by a control message of the MAC layer.

Furthermore, the repetition control timer may be started upon reception of the random access response message or upon reception of the contention resolution message. Furthermore, the repetition control timer may be started upon transmission of the message 3. When the repetition control timer is started by such a random access procedure message, the repetition control timer is desirably announced by the system information to the MTCUE 3-1.

Furthermore, when the repetition control timer expires, the MTCUE 3-1 may announce the expiration of the repetition control timer, to the base station device 5. For example, when the repetition control timer expires, the MTCUE 3-1 executes the random access procedure. The MTCUE 3-1 transmits the announcement with the information indicating the expiration of the repetition control timer into the message 3, to the base station device 5. When receiving the information indicating the expiration of the repetition control timer, the base station device 5 reconfigures the number of repetitive transmissions and receptions to the MTCUE 3-1.

Furthermore, a timer value (or an expiration value) of the repetition control timer may be determined on the basis of the repetition number. Furthermore, the value of the repetition control timer may be obtained by calculation based on the repetition number. For example, when the repetition number is A (where A is a natural number), the value of the repetition control timer may be determined by A×n. n may be a system-specific fixed value (for example, n=10), and may be individually configured by the RRC message or the system information.

Furthermore, the transmission timing timer may be reused for the repetition control timer. For example, when the MTCUE 3-1 receives the transmission timing information to restart the transmission timing timer, if the number of repetitive transmissions and receptions is announced, then the application of the announced number of receptions of transmission and reception is started. When the repetition number is not announced, the MTCUE 3-1 continues the configured repetition number. When the transmission timing timer expires, the MTCUE 3-1 stops the uplink transmission and discards the applied number of repetitive transmissions and receptions.

Note that the above-described physical uplink shared channel PUSCH, physical downlink shared channel PDSCH, physical uplink control channel PUCCH, physical downlink control channel PDCCH, enhanced physical downlink control channel EPDCCH, and physical random access channel PRACH may be a physical uplink shared channel PUSCH, a physical downlink shared channel PDSCH, a physical uplink control channel PUCCH, a physical downlink control channel PDCCH, an enhanced physical downlink control channel EPDCCH, and a physical random access channel PRACH dedicated to the MTCUE.

Note that the base station device 5 may configure a plurality of types of repetition numbers and configure repetition levels or bundling sizes, each of which corresponds to the plurality of types of repetition numbers. For example, in the case in which the repetition level is 1, the repetition number is configured to 10 times; in the case in which the repetition level is 2, the repetition number is configured to 20 times; and in the case in which the repetition level is 3, the repetition number is configured to 30 times. The base station device 5 may also announce the repetition level or the bundling size to the MTCUE 3-1. Furthermore, the MTCUE 3-1 may calculate, on the basis of the repetition level or the bundling size, the expiration value of the repetition control timer, the expiration value of the contention resolution timer, or the random access response window.

The information on the repetitive transmission and reception control may be received by the MTCUE 3-1, and may be included only in the system information broadcast by using the system information block (the system information block type 1A) different from the system information block (the system information block type 2, for example) received by the mobile station device 1-1. In the base station device 5, the parameters described above such as the repetition level, the bundling size, the expiration value of the repetition control timer, and the expiration value of the contention resolution timer corresponding to the repetition level may be included in the system information broadcast by using the system information block (system information block type 1A) received by the MTCUE 3-1. That is, the random access common configuration information of the system information broadcast by using the system information block (system information block type 2) received by the mobile station device 1-1 and the random access common configuration information of the system information broadcast to the MTCUE 3-1 may be different and independent.

Note that the base station device 5 periodically transmits the system information at the RRC level. In the reception processing of each piece of system information by the MTCUE 3-1, the HARQ processing is performed in the MAC layer of the MTCUE 3-1. Furthermore, the repetition control on reception of the physical downlink control channel PDCCH, reception of the enhanced physical downlink control channel EPDCCH, transmission of the physical uplink control channel PUCCH, and transmission of the physical random access channel PRACH (or the random access preamble) are performed in the PHY layer of the MTCUE 3-1.

In the above processing, the MTCUE may be classified depending on the type of the mobile station device. The mobile station device may be divided into two types where the mobile station device configured to perform an operation of the mobile station device 1-1 is classified as a first type of mobile station device; and the mobile station device configured to perform an operation of the MTCUE 3-1 is classified as a second type of mobile station device. Furthermore, the mobile station device may be divided into two types, where the mobile station device configured to perform an operation of the mobile station device 1-1 is classified as a first type of mobile station device; and the mobile station devices to which different repetition numbers are configured, out of the mobile station devices configured to perform an operation of the MTCUE 3-1, are each classified as a second type and a third type. Furthermore, the first type of mobile station device may be classified as a category from a category 0 to a category 13, the second type of mobile station device may be classified as a category X other than the category indicated in the first type of mobile station device, and the third type of mobile station device may be classified as a category Y other than the categories indicated in the first type and the second type of mobile station devices.

Furthermore, the content described by using a specific numerical value is just an exemplary numerical value used for the sake of description, and any suitable value may be used.

An embodiment of the present invention has been described in detail thus far with reference to the drawings, but the specific constitution is not limited to the above constitution. Other designs and the like that do not depart from the essential spirit of the invention also fall within the scope of the present invention.

According to the embodiment, the mobile station device corresponding to machine type communication is described as one example of a terminal device or a communication device, but the present invention is not limited to this, and can be applied to a terminal apparatus or a communication apparatus, such as a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

Furthermore, for the sake of description, the MTCUE 3-1 and the base station device 5 according to the embodiment are described by using a functional block diagram; however, it may be possible that a program for realizing a function or a part of a function of each unit of the MTCUE 3-1 and the base station device 5 is recorded on a computer-readable recording medium and the program recorded on the recording medium is read and executed by a computer system to control the mobile station device and the base station device. Note that the "computer system" here may include an OS and hardware components such as a peripheral device.

Furthermore, the "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, each functional block used in the above embodiment may be implemented as an LSI, typically, an integrated circuit. The functional blocks may be individually realized as chips, or may be partially or completely integrated into a chip. The circuit integration technique is not limited to LSI, and the integrated circuits for the functional blocks may be realized as dedicated circuits or a multipurpose processor. Furthermore, if with advances in semiconductor technology, a circuit integration technology with which an LSI is replaced appears, it is also possible to use an integrated circuit based on the technology.

An embodiment of the invention has been described in detail thus far with reference to the drawings, but the specific constitution is not limited to the embodiment. Other designs and the like that do not depart from the essential spirit of the invention also fall within the scope of the patent claims. In other words, the description of the present specification is for the purpose of exemplary description, and does not impose any limitations on the embodiments of the present invention.

INDUSTRIAL APPLICABILITY

It is possible to apply some aspects of the present invention to a radio communication system, a terminal device, a base station device, a radio communication method, an integrated circuit or the like necessary for a terminal device corresponding to machine type communication connected to a base station device to perform transmission and reception control by efficient repetition.

REFERENCE SIGNS LIST 1-1 to 1-3 Mobile station device
3-1 to 3-3 MTCUE
5 Base station device
101, 201 Data generation unit
103, 203 Transmission data storage unit
105, 205 Transmission HARQ processing unit
107, 207 Transmission processing unit
109, 209 Radio unit
111, 211 Reception processing unit
113, 213 Reception HARQ processing unit
115, 215 MAC information extraction unit
117, 217 PHY control unit
119, 219 MAC control unit
121, 221 Data processing unit
123, 223 RRC control unit

The invention claimed is:

1. A terminal device configured to perform a random access procedure with a base station device, the terminal device comprising:
a processor; and
a memory,
wherein the memory stores instructions that causes the processor to:
receive random access common information including information on a random access response reception and information on a contention resolution timer value for each repetition level from the base station device;
select, based on the random access common information, a contention resolution timer value corresponding to a selected repetition level; and
perform a repetitive transmission of a message 3 based on the selected repetition level, wherein the contention resolution timer is started at a last transmission of the repetitive transmission of the message 3, and
an expiration value of the contention resolution timer is configured according to a number of repetitive transmissions of a random access preamble.

2. The terminal device according to claim 1, wherein the random access common information is acquired from system information of a cell corresponding to a random access procedure for each repetition level.

3. A base station device configured to perform a random access procedure with a terminal device, comprising:
a processor; and
a memory,
wherein the memory stores instructions that causes the processor to:
generate random access common information including information on a random access response reception and information on a contention resolution timer value for each repetition level; and
transmit the random access common information to the terminal device,
wherein a repetitive transmission of a message 3 is performed by the terminal device based on a repetition level selected by the terminal device,
the contention resolution timer is started at a last transmission of the repetitive transmission of the message 3, and
an expiration value of the contention resolution timer is configured according to a number of repetitive transmissions of a random access preamble.

4. The base station device according to claim 3, wherein the random access common information is included in system information for the terminal device corresponding to a random access procedure for each repetition level and transmitted.

5. A communication method of a terminal device configured to perform a random access procedure with a base station device, comprising the steps of:
receiving random access common information including information on a random access response reception and information on a contention resolution timer value for each repetition level from the base station device;
selecting, based on the random access common information, a contention resolution timer value corresponding to a selected repetition level; and
performing a repetitive transmission of a message 3 based on the selected repetition level, wherein the contention resolution timer is started at a last transmission of the repetitive transmission of the message 3, and
an expiration value of the contention resolution timer is configured according to a number of repetitive transmissions of a random access preamble.

6. A communication method of a base station device configured to perform a random access procedure with a terminal device, comprising the steps of:
generating random access common information including information on a random access response reception and information on a contention resolution timer value for each repetition level; and
transmitting the random access common information to the terminal device,
wherein a repetitive transmission of a message 3 is performed by the terminal device based on a repetition level selected by the terminal device,
the contention resolution timer is started at a last transmission of the repetitive transmission of the message 3, and
an expiration value of the contention resolution timer is configured according to a number of repetitive transmissions of a random access preamble.

7. An integrated circuit applied to a terminal device configured to perform a random access procedure with a base station device, comprising:
a unit configured to receive random access common information including information on a random access response reception and information on a contention resolution timer value for each repetition level from the base station device;
a unit configured to select, based on the random access common information, a contention resolution timer value corresponding to a selected repetition level; and a unit configured to perform a repetitive transmission of a message 3 based on the selected repetition level, wherein the contention resolution timer is started at a last transmission of the repetitive transmission of the message 3, and an expiration value of the contention resolution timer is configured according to a number of repetitive transmissions of a random access preamble.

8. An integrated circuit applied to a base station device configured to perform a random access procedure with a terminal device, comprising:

a unit configured to generate random access common information including information on a random access response reception and information on a contention resolution timer value for each repetition level; and a unit configured to transmit the random access common information to the terminal device, wherein a repetitive transmission of a message 3 is performed by the terminal device based on a repetition level selected by the terminal device, the contention resolution timer is started at a last transmission of the repetitive transmission of the message 3, and an expiration value of the contention resolution timer is configured according to a number of repetitive transmissions of a random access preamble.

\* \* \* \* \*